(12) United States Patent
Nakajima et al.

(10) Patent No.: US 6,656,595 B2
(45) Date of Patent: Dec. 2, 2003

(54) PIGMENT DISPERSING RESINS

(75) Inventors: Yoshio Nakajima, Hiratsuka (JP); Yoshiyuki Yukawa, Hiratsuka (JP); Isao Kamimori, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 109 days.

(21) Appl. No.: 09/975,197

(22) Filed: Oct. 12, 2001

(65) Prior Publication Data

US 2002/0077411 A1 Jun. 20, 2002

(30) Foreign Application Priority Data

Oct. 13, 2000 (JP) .......................... 2000-314504
Nov. 9, 2000 (JP) .......................... 2000-342050

(51) Int. Cl.$^7$ .................. B32B 27/38; B32B 27/30; C08G 65/32; C08F 8/14; C08L 51/00
(52) U.S. Cl. .................. 428/413; 428/523; 525/55; 525/65; 525/66; 525/69; 525/403; 525/404; 524/504
(58) Field of Search .................. 428/413, 418, 428/523; 525/63, 64, 65, 66, 69, 403, 404, 55; 524/504

(56) References Cited

U.S. PATENT DOCUMENTS

| | | |
|---|---|---|
| 5,955,532 A | 9/1999 | Chang et al. |
| 6,107,392 A | 8/2000 | Antonelli et al. |
| 6,174,953 B1 | 1/2001 | Huybrechts |
| 6,548,174 B2 | 4/2003 | Nakajima et al. |

2002/0143087 A1 * 10/2002 Haubennestel et al. ..... 524/379

FOREIGN PATENT DOCUMENTS

| | | |
|---|---|---|
| WO | 95/19999 | 7/1995 |
| WO | 99/45078 | 9/1999 |

* cited by examiner

Primary Examiner—Robert Dawson
Assistant Examiner—Michael J Feely
(74) Attorney, Agent, or Firm—Wenderoth, Lind & Ponack, L.L.P.

(57) ABSTRACT

This invention relates to use of copolymers which are obtained through copolymerization, in the presence of a radical-polymerization initiator, of monomeric mixtures comprising:

macromonomers obtained by (co)polymerizing, in the presence of a metal complex which is a catalytic chain transfer agent or an addition-cleavage-type chain transfer agent, and optionally a radical-polymerization initiator, at least one polymerizable monomer selected from methacrylic acid esters and styrene and if necessary methacrylic acid, or the macromonomers into which polymerizable unsaturated groups are further introduced;

polymerizable unsaturated monomers containing at least one ionic functional group selected from amino, quaternary ammonium salt and sulfonic acid groups;

polyoxyalkylene chain-containing nonionic polymerizable unsaturated monomers; and other ethylenically unsaturated monomers (D); and also such copolymers into which long chain alkyl groups are further introduced, as pigment-dispersing resins to be used in water-based paints.

62 Claims, No Drawings

PIGMENT DISPERSING RESINS

This invention relates to pigment dispersing resins which are conveniently applicable to water-based paint, in particular, water-based automotive finish; and also to water-based pigment dispersions and water-based paint compositions which contain said pigment dispersing resin.

As paint for automotive finish, heretofore those of solvent-based type have been widely used, in which a base resin (base polymer) component such as acrylic resin, polyester resin or alkyd resin having such functional groups as hydroxyl and carboxyl groups; and a curing agent such as amino resin, optionally blocked polyisocyanate compound, epoxy compound and the like are concurrently used.

For the protection of terrestrial environment, paint of low volatile organic matter content (VOC) is demanded in these years. In the field of paint for automotive finish, switching to water-based paint of, in particular, colored base coating paint whose VOC discharge is high has been strongly required, and it is expected that replacement of solvent-based coating with water-based coating will proceed hereafter.

Problems incidental to the switching are, for example: (1) pigment dispersing resin blended in water-based paint is incompatible with the binder component in water-based paint; (2) pigment dispersing resin or dispersant fail to uniformly disperse the pigment and invite flocculation or agglomeration of the pigment; and (3) the pigment dispersing resin or dispersant in the water-based paint composition fail to cure under baking and invite degradation of the coating film performance.

Those pigments used for colored base coating paint generally have hydrophobic surfaces and are difficult to be water-wettable, while pigment dispersing resins conventionally used for solvent-based colored paints have low solubility in water and are inferior in dispersing stability in aqueous media. Hence it is important in designing a pigment dispersing resin for water-based paint, to secure satisfactory levels of both wettability of pigment and dispersing stability of the pigment dispersing resin in an aqueous medium.

Low viscosity and low molecular weight of pigment dispersing resin are considered advantageous for wetting property of pigment; and easy formation of steric repelling layer on the pigment surfaces or good solubility of the pigment dispersing resin in the continuous phase (aqueous medium) are considered advantageous for the dispersing stability. Both the pigment-wetting property and the dispersing stability of the pigment dispersing resin are considered to participate in wetting of the pigment surface with the pigment dispersing resin (a resin having a group capable of forming weak flocculation in aqueous system such as alkyl-group is effective) and in adsorption onto the pigment, which are attributable to the interaction between hydrophobic part on the pigment surface and that of pigment dispersing resin.

Past development of pigment dispersing resins or assistant for water-based paint has been advanced based on the foregoing viewpoints. For instance, Sho 50 (1975)-154328A-JP proposed use of a straight chain anionic polymer containing acidic functional groups, which is obtained through polymerization of a monomer mixture containing as a part of its monomer components an acidic functional group-containing, polymerizable unsaturated monomer such as (meth)acrylic acid, as the pigment dispersing resin. Said polymer, however, exhibits high solubility in aqueous media and hence is unsatisfactory in respect of wetting of pigment. Furthermore, pigment dispersions formed with the use of said polymer show excessively high viscosity and are subject to a drawback of difficult handling.

Hei 1 (1989)-182304A1-JP, Canadian Patent 2149399 and U.S. Pat. No. 5,231,131 disclosed, as the pigment dispersing resin, a graft copolymer obtained through copolymerization of carboxyl-containing macromonomers. Said graft copolymer excels in pigment dispersing stability because its trunk portion is hydrophobic and the branch portion is hydrophilic. Whereas, pigment dispersions formed with the use of said copolymer show high viscosity, and the graft copolymer is far from being satisfactory, in view of the increasing demand for pigment dispersions having high pigment concentration to save cost and to reduce VOC.

On the other hand, top coating paints for automotive finish are required not only high film performance such as durability, acid resistance, washability (scratch resistance) and chipping resistance, but also still better appearance of coated film in sharpness, transparency, color development and the like.

An object of the present invention is to provide pigment dispersing resins which excel in wetting property and dispersing stability even at high pigment concentration and which can provide aqueous pigment dispersions of low viscosity and excellent color developing property.

A further object of the present invention is to provide a water-based pigment dispersion which has low viscosity even at high pigment concentration and which excels in color-developing property.

Another object of the invention is to provide a water-based paint which excels in curability and is capable of forming a painted film of splendid finish appearance in sharpness, transparency, color-developing property and the like.

Still other objects and characteristics of the invention will become apparent from the following descriptions.

We have engaged in concentrative studies with the view to accomplish the above objects and now discovered that copolymers obtained by introducing ionic hydrophilic functional groups and nonionic functional groups into macromonomers which are obtained through copolymerization of specific monomer component such as methacrylic acid ester, styrene or the like in the presence of a metal complex which is a catalytic chain transfer agent or an addition-cleavage type chain transfer agent, and if necessary a radical polymerization initiator, are very favorable as pigment dispersing resin for water-based paint, and thus completed the present invention.

Accordingly, the invention provides a pigment dispersing resin which has a weight-average molecular weight within a range of 3,000–100,000 and which is obtained by copolymerizing a monomeric mixture comprising:

a macromonomer (A) formed through (co)polymerizing, in the presence of a metal complex which is a catalytic chain transfer agent or an addition-cleavage type chain transfer agent and if necessary a radical polymerization initiator, a monomer component comprising at least one polymerizable monomer selected from methacrylic acid esters and styrene, and if necessary methacrylic acid;

a polymerizable, unsaturated monomer (B) containing at least one kind of ionic functional group selected from amino, quaternary ammonium salt and sulfonic acid groups;

a nonionic, polymerizable unsaturated monomer (C) having polyoxyalkylene chain; and other ethylenically unsaturated monomer (D); in the presence of a radical polymerization initiator (which copolymer is hereafter referred to as "pigment dispersing resin I").

The invention also provides a pigment dispersing resin ("pigment dispersing resin II") which has a weight-average molecular weight within a rang of 3,000–100,000 and which is obtained by co-polymerizing a monomeric mixture comprising:

a carboxyl-containing macromonomer (A-1) having a resin acid value of 50–450 mgKOH/g which is obtained through copolymerization of methacrylic acid with at least one copolymerizable monomer selected from methacrylic acid esters and styrene, in the presence of a metal complex which is a catalytic chain transfer agent or an addition-cleavage type chain transfer agent and if necessary a radical polymerization initiator;

a polymerizable unsaturated monomer (B) containing at least one kind of ionic functional group selected from amino, quaternary ammonium salt and sulfonic acid groups;

a nonionic, polymerizable unsaturated compound (C) having polyoxyalkylene chain, and other ethylenically unsaturated monomer (D); in the presence of a radical polymerization initiator, and reacting the resultant copolymer (X) with an epoxy-containing long chain alkyl compound (E) to introduce the long chain alkyl group into the former.

The invention further provides a pigment dispersing resin ("pigment dispersing resin III") which has a weight-average molecular weight within a range of 3,000–100,000 and which is obtained by copolymerizing a monomeric mixture comprising a long-chain alkyl-containing macromonomer (A-2) which is formed through reaction of above carboxyl-containing macromonomer (A-1) with an epoxy-containing long-chain alkyl compound (E):

a polymerizable, unsaturated monomer (B) containing at least one kind of ionic functional group selected from amino, quaternary ammonium salt and sulfonic acid groups;

a nonionic, polymerizable unsaturated monomer (C) having a polyoxyalkylene chain, and other ethylenically unsaturated monomer (D) in the presence of a radical polymerization initiator.

The invention also provides a pigment dispersing resin ("pigment dispersing resin IV") which has a weight-average molecular weight of 3,000–100,000 and a resin acid value of 10–200 mgKOH/g and which is obtained by copolymerizing a monomeric mixture comprising:

a polymerizable, unsaturated group-containing macromonomer (A-3) which is formed through an esterification reaction of above carboxyl-containing macromonomer (A-1) with an epoxy-containing polymerizable unsaturated compound (F)

a polymerizable, unsaturated monomer (3) containing at least one kind of ionic functional group selected from amino, quaternary ammonium salt and sulfonic acid groups;

a nonionic polymerizable unsaturated monomer (C) having a polyoxyalkylene chain, and other ethylenically unsaturated monomer (D) in the presence of a radical polymerization initiator.

The invention furthermore provides a pigment dispersing resin ("pigment dispersing resin V") having a weight-average molecular weight ranging 3,000–100,000 and a resin acid value ranging 10–200 mgKOH/g and which is obtained by introducing into a copolymer (Y) a long-chain alkyl group by reacting said copolymer with an epoxy-containing long chain alkyl compound (E), said copolymer (Y) having been obtained through copolymerization of a monomeric mixture comprising a polymerizable unsaturated group-containing macromonomer (A-3) which is obtained through esterification reaction of above carboxyl-containing macromonomer (A-1) with an epoxy-containing polymerizable unsaturated compound (F);

a polymerizable, unsaturated monomer (B) containing at least one kind of ionic functional group selected from amino, quaternary ammonium salt and sulfonic acid groups;

a nonionic polymerizable unsaturated monomer (C) having a polyoxyalkylene chain, and other ethylenically unsaturated monomer (D) in the presence of a radical polymerization initiator.

The invention provides still another pigment dispersing resin ("pigment dispersing resin VI") having a weight-average molecular weight ranging 3,000–100,000 and a resin acid value ranging 10–200 mgKOH/g, which is obtained through copolymerization of a monomeric mixture comprising:

a long-chain alkyl- and polymerizable unsaturated group-containing macromonomer (A-4) which is obtained through reaction of said carboxyl-containing macromonomer (A-1) with an epoxy-containing long chain alkyl compound (E) and an epoxy-containing polymerizable unsaturated compound (F), a polymerizable, unsaturated monomer (B) containing at least one kind of ionic functional group selected from amino, quaternary ammonium salt and sulfonic acid groups;

a nonionic polymerizable unsaturated monomer (C) having a polyoxyalkylene chain, and other ethylenically unsaturated monomer (D) in the presence of a radical polymerization initiator.

The invention also provides a water-based pigment dispersion which comprises at least one of above pigment dispersing resins I–VI, pigment, aqueous medium and a basic neutralizing agent, and if necessary a dispersion assistant.

The invention furthermore provides a water-based paint composition which comprises the above water-based pigment dispersion.

Hereafter we will explain in further details the pigment dispersing resins, water-based pigment dispersions and the water-based paint compositions, all according to the present invention.

Pigment dispersing resin I

The pigment dispersing resin I according to the invention comprises a copolymer of a macromonomer (A), polymerizable unsaturated monomer (B) containing ionic functional group(s), nonionic polymerizable unsaturated monomer (C) and other ethylenically unsaturated monomer ()).

Macromonomer (A):

Macromonomer (A) is the monomer component which is characteristic of those pigment dispersing resins of the present invention, and is prepared by (co-)polymerizing a monomer component(s) which comprise(s) at least one polymerizable monomer selected from the group consisting of methacrylic acid esters and styrene, and optionally methacrylic acid, in the presence of a metal complex which is a catalytic chain transfer agent or an addition-cleavage type chain transfer agent, and if necessary a radical polymerization initiator.

Where a catalytic chain transfer agent is used, the (co-)polymerization is referred to as Catalytic Chain Transfer Polymerization, i.e., "CCTP process".

CCTP processes are described, for example, in U.S. Pat. No. 4,694,054, U.S. Pat. No. 4,694,054, EP 712419 and U.S. Pat. No. 5,721,330, Macro-molecules, 1996, 29, 8083–8089, and any of these known CCTP processes can be used for preparing the macromonomer (A). That is, for carrying out the (co-)polymerization by means of a catalytic chain transfer process, the monomer components) is (are) subjected to, for example, solution polymerization in an organic solvent or emulsion polymerization in an aqueous medium, in the presence of a metal complex which is a catalytic chain transfer agent and a radical polymerization initiator.

As examples of the metal complex useful for said copolymerization, cobalt complex, iron complex, nickel complex, ruthenium complex, rhodium complex, palladium complex, rhenium complex and iridium complex may be named. Of those, cobalt complex is preferred because it acts as a catalytic chain transfer agent very effectively.

As useful cobalt complexes, those known per se from prior art references such as Hei 6 (1994)-23209B1-JP, Hei 7 (1995)-35411B1-JP, U.S. Pat. No. 4,526,945, U.S. Pat. No. 4,694,054, U.S. Pat. No. 4,837,326, U.S. Pat. No. 4,886,861, U.S. Pat. No. 5,324,879, WO 95/17435, and WO 95/25765 can be used, specific examples including bis (borondifluorodioxyiminocycloyhexane)Co (II), bis(1,2-dioxyiminoethane)Co (II), bis (borondifluorodimethylgyoximate)Co (II), bis (borondifluorodiphenylglyoximate)Co (II), cobalt (II) chelate of vicinal iminohydroxyimino compound, cobalt (II) chelate of diazadihydroxyiminodialkyldecadiene, cobalt (II) chelate of diazadi-hydroxyiminodialkylundecadiene, cobalt (II) chelate of tetraazatetraalkylcyclotetradecatetraene, cobalt (II) chelate of tetraazatetraalkylcyclotetradodecatetraene, cobalt (II) chelate of N,N'-bis(salicylidene)ethylenediamine, cobalt (II) chelate of dialkyldiazadioxodialkyldodecadiene, cobalt (II) chelate of dialkyldiazadioxodialkyltridecadiene and cobalt (II) porphyrin complex and the like. Of these, readily available bis(borondifluorodimethylglyoximate)Co (II) and bis-(borondifluorodiphenylglyoximate)Co (II) are used with particular convenience.

Metal complexes in which radical cleavable groups are directly bound to metals, such as those described in WO 87/03605, can also be used as the catalytic chain transfer agent. Examples of the metals include cobalt, rhenium and iridium, and examples of radical cleavable groups include alkyl, aryl and heterocyclic groups. In the systems using such a metal complex in which a radical cleavable group is directly bound to a metal, concurrent use of a radical polymerization initiator is unnecessary.

The use rate of above metal complex serving as a catalytic chain transfer agent is not critical. Whereas, normally the suitable amount is within a range of from $1 \times 10^{-6}$ to 1 part by weight, preferably $1 \times 10^{-4}$ to 0.5 part by weight, per 100 parts by combined weight of the methacrylic acid and at least one copolymerizable monomer selected from methacrylic acid esters and styrene.

For adjusting reactivity, or improving solubility, of the metal complex, a known coordination compound may be concurrently used, if required. Examples of useful coordination compound include phosphorus compounds such as triphenylphosphine and tributylphosphine; and amine compounds such as pyridine and tributylamine.

As the polymerization initiators useful for CCTP processes, the following may be named for example: organic peroxide polymerization initiators including ketone peroxides such as cyclohexanone peroxide, 3,3,5-trimethylcyclohexanone peroxide and methylcyclohexanone peroxide; peroxyketals such as 1,1-bis(tert-butylperoxy)-3, 3, 5-trimethylcyclohexane, 1,1-bis(tert-butylperoxy) cyclohexane and n-butyl-4,4-bis(tert-butylperoxy)valerate; hydroperoxides such as cumene hydroperoxide and 2,5-dimethylhexane-2,5-dihydroperoxide; dialkylperoxides such as 1,3-bis(tert-butylperoxy-m-isopropyl)benzene, 2,5-dimethyl-2,5-di(tert-butylperoxy)hexane, diisopropylbenzene peroxide and tert-butylcumyl peroxide; diacyl peroxides such as decanoyl peroxide, lauroyl peroxide, benzoyl peroxide and 2,4-di-chlorobenzoyl peroxide; peroxycarbonates such as bis(tert-butylcyclohexyl)peroxydicarbonate; and peroxy esters such as tert-butylperoxy-benzoate and 2,5-dimethyl-2,5-di(benzoylperoxy)hexane; and azo polymerization initiators including 2,2'-azobisisobutyronitrile, 1,1-azobis(cyclohexane-1-carbonitrile), azocumene-2'-azobismethyl-valeronitrile and 4,4'-azobis(4-cyanovalerianic acid). The use rate of these polymerization initiators is not critical, while normally it is desirably within a range of 0.1–15 parts by weight, in particular, 0.3–8 parts by weight, per 100 parts by weight of the combined sum of the monomers to be copolymerized.

Where an addition-cleavable chain transfer agent is used in said (co-)polymerization reaction, the (co-)polymerization is performed by radical addition-cleavage type chain transfer process. As such addition-cleavage type chain transfer agent, 2,4-diphenyl-4-methyl-1-pentene (abbreviated as "α-methylstyrene dimer") can be named as an example. The use rate of such an addition-cleavage type chain transfer agent is not critical, but it is normally suitable to use 1–50 parts by weight, preferably 5–30 parts by weight, per 100 parts by weight of the total sum of the monomers to be copolymerized.

Where such radical addition-cleavage-type chain transfer polymerization is conducted as the (co-)polymerization reaction, the 10 monomer component(s) can be polymerized by such means as solution polymerization in an organic solvent or emulsion polymerization in an aqueous medium, in the presence of an addition-cleavage type chain transfer agent and optionally a radical polymerization initiator. As the radical polymerization initiator, any of those exemplified as the polymerization initiators useful for CCTP processes can be used.

Said macromonomer (A) is obtained by (co-)polymerizing a monomer component(s) which comprise(s) at least one polymerizable monomer selected from methacrylic acid esters and styrene, and optionally methacrylic acid, by any of the processes as above-described. Specific examples of methacrylic acid esters include: linear, branched or cyclic $C_1$–$C_{24}$ alkyl esters of methacrylic acid such as methyl methacrylate, ethyl methacrylate, n-propyl methacrylate, isopropyl methacrylate, n-butyl methacrylate, isobutyl methacrylate, tert-butyl methacrylate, 2-ethylhexyl methacrylate, n-octyl meth-acrylate, lauryl methacrylate, stearyl methacrylate, cyclohexyl meth-acrylate, isobornyl methacrylate and tridecyl methacrylate; $C_2$–$C_4$ hydroxyalkyl esters of methacrylic acid such as 2-hydroxyethyl meth-acrylate, hydroxypropyl methacrylate, 2,3-dihydroxybutyl methacrylate and 4-hydroxylbutyl methacrylate; monoesterified compounds of polyhydric alcohol with methacrylic acid, such as polyethylene glycol monomethacrylate; and ring-opening polymerization products of said monoesterified products of polyhydric alcohol with methacrylic acid, with 2-caprolactone. These polymerizable unsaturated monomers can be used either singly or in combination of two or more.

The ratio of methacrylic acid to said at least one polymerizable monomer selected from methacrylic acid esters and styrene is normally 0–70%, preferably 5–70%, inter alia, 8–60% by weight, of methacrylic acid to 30–100%, preferably 30–95%, inter alia, 40–92% by weight, of the polymerizable monomer(s), the percentages being based on the combined weight of all the monomers to be copolymerized.

As the polymerization method for obtaining the macromonomer (A), solution polymerization in an organic solvent, emulsion polymerization in an aqueous medium, and the like can be used as aforesaid, in particular, solution polymerization being preferred. In an embodiment of the solution polymerization, said monomer component(s) (at least one polymerizable monomer selected from methacrylic acid esters and styrene, and optionally methacrylic acid); a metal complex which is the catalytic chain transfer agent, or an addition-cleavage type chain transfer agent; and if necessary a radical polymerization initiator; are dissolved or dispersed in an organic solvent and are (co-)polymerized under heating under stirring, normally at temperatures ranging from about 80° C.–about 200° C., for about 1–10 hours.

Examples of the useful organic solvent include hydrocarbon solvents such as heptane, toluene, xylne, octane and mineral spirit; ester solvents such as ethyl acetate, n-butyl acetate, isobutyl acetate, ethylene glycol monomethylether acetate and diethylene glycol monobutylether acetate; ketone solvents such as methyl ethyl ketone, methyl isobutyl ketone, diisobutyl ketone and cyclohexanone; alcohol solvents such as methanol, ethanol, isopropanol, n-butanol, sec-butanol and isobutanol; ether solvents such as n-butyl ether, dioxane, ethylene glycol monomethyl ether and ethylene glycol monoethyl ethyl ether and the like; and aromatic petroleum solvents such as Swasol™310, Swasol™1000 and Swasol™1500 of Cosmo Oil Co., Ltd. Those organic solvents can be used either singly or in combination of two or more. At the time of (co-)polymerization, the organic solvent is normally used in an amount not more than 400 parts by weight based on the total weight of the monomer components to be (co-)polymerized.

In the above (co-)polymerization reaction, the method of addition of the components to be polymerized or the polymerization initiator is not critical. Whereas, the polymerization initiator is conveniently added dropwise plural times by portions over the time spun from the initial stage of polymerization to the advanced stage, rather than adding in a lump sum at the initial stage, for effective temperature control during the polymerization reaction and prevention of undesirable cross-linked product such as gel from forming.

So obtained macromonomer (A) has at least one polymerizable unsaturated bond, preferably only one polymerizable unsaturated bond, at one end of its molecule. From the standpoints of aqueous dispersion stability, pigment dispersion stability, viscosity, VOC and color number (extent of coloring) of the resin, the macromonomer (A) conveniently has a resin acid value within a range of 30–450 mgKOH/g, preferably 50–400 mgKOH/g, inter aha, 55–350 mgKOH/g. While the molecular weight of macromonomer (A) is not critical, it normally ranges, in terms of weight-average molecular weight, 300–15,000, preferably 500–10,000, in particular, 500–7,000.

Polymerizable unsaturated monomer (B) containing ionic functional group(s):

The monomer (B) is a polymeizable unsaturated monomer having at least one kind of ionic functional group selected from amino (preferably tertiary amino), quaternary ammonium salt and sulfonic acid groups.

Specific examples of the monomer (B) include N,N-dialkylaminoalkyl (meth)acrylates such as N,N-dimethylaminoethyl (meth)acrylate, N,N-diethylaminoethyl (meth)acrylate, N, N-di-methylaminopropyl (meth)acrylate, N,N-di-t-butylaminoethyl (meth)-acrylate and N,N-dimethylaminobutyl (meth)acrylate; quaternary ammonium salt group-containing, polymerizable unsaturated monomers represented by (meth)acryloyloxyalkyl trialkylammonium halides such as methacryloyloxyethyl trimethylammonium chloride; and sulfonic acid group-containing, polymerizable unsaturated monomers represented by (meth)acrylamide-alkanesulfonic acid such as 2-acrylamide-2-methylpropanesulfonic acid.

Of those, N,N-dimethylaminoethyl (meth)acrylate, methacryloyloxyethyltrimethylammonium chloride and 2-acrylamide-2-methylpropanesulfonic acid are particularly suitable.

Nonionic polymerizable unsaturated monomer (C) containing polyoxy-alkylene chain:

The monomer (C) is a nonionic, polymeizable unsaturated monomer containing polyoxyalkylene chain, which include those compounds represented by the following formula:

in which $R^1$ stands for hydrogen or $CH_3$, $R^2$ stands for hydrogen or $C_1$–$C_4$ alkyl, m is an integer of 4–60, in particular, 4–55, and n is an integer of 2–3, here the m oxyalkylene units ($C_nH_{2n}O$) may all be the same or different from each other.

Specific examples of such monomer (C) are as follows: tetraethylene glycol (meth)acrylate, methoxytetraethylene glycol (meth)acrylate, ethoxytetraethylene glycol (meth)acrylate, n-butoxy-tetraethylene glycol (meth)acrylate, tetrapropylene glycol (meth)-acrylate, methoxytetrapropylene glycol (meth)acrylate, ethoxytetra-propylene glycol (meth)acrylate, n-butoxytetrapropylene glycol (meth)acrylate, polyethylene glycol (meth)acrylate, polypropylene glycol (meth)acrylate, methoxypolyethylene glycol (meth)acrylate and ethoxypolyethylene glycol (meth)acrylate. Of those, polyethylene glycol (meth)acrylate and polypropylene glycol (meth)acrylate are particularly suitable.

Other ethylenically unsaturated monomer (D):

Other ethylenically unsaturated monomer (D) comprises polymeizable unsaturated monomers other than the above monomer (B) and monomer (C), and is suitably selected according to property(ies) ultimately desired for individual pigment dispersing resins.

As such monomer (D), methacrylic acid esters and styrene can be conveniently used. Methacrylic acid ester(s) can be suitably selected from those earlier enumerated as examples of methacrylic acid esters useful for the preparation of macromonomer (A). Also as the other ethylenically unsaturated monomer (D), besides said monomer(s) selected from methacrylic acid esters and styrene, up to 30% by weight based on the total weight of the ethylenically unsaturated monomer (D) of other monomer or monomers may be used.

Examples of such other monomers include $C_1$–$C_{24}$ alkyl esters of acrylic acid such as methyl acrylate, ethyl acrylate, isopropyl acrylate, n-butyl acrylate, isobutyl acrylate, tert-butyl acrylate, 2-ethylhexyl acrylate and stearyl acrylate; $C_2$–$C_4$ hydroxyalkyl esters of acrylic acid such as 2-hydroxyethyl acrylate; aminoalkyl acrylates such as N,N-dimethylaminoethyl acrylate, N,N-diethylaminoethyl acrylate and N,N-dimethylaminopropyl methacrylate; (meth) acrylamides and their derivatives such as (meth)acrylamide, N,N-di-methylaminoethyl (meth)acrylamide, N,N- diethylaminoethyl (meth)-acrylamide, N-methylol (meth) acrylamide methyl ether and N-methylol (meth)acrylamide butyl ether; oxetane ring-containing (meth)acrylates such as 3-ethyl-3-(meth)acryloyloxymethyl oxetane and 3-methyl-3-(meth)acryloyloxymethyl oxetane; carboxyl-containing polymerizable unsaturated monomers such as methacrylic acid and acrylic acid; and (methacrylonitrile, vinyl acetate and vinyltoluene. These monomers may be used either singly or in combination of two or more.

Because the pigment dispersing resins offered by the present invention are mainly used for preparation of colored water-based based coating paints, it is desirable for favorable paint film performance that they react with curing agent component, e.g., amino resins or optionally blocked polyisocyanate compounds to be incorporated into the crosslinked paint film. Therefore, the monomer (D) component desirably contains a hydroxyl-containing polymerizable unsaturated monomer.

Specific examples of such hydroxyl-containing polymerizable unsaturated monomer include monoesters between polyhydric alcohols and acrylic acid or methyacrylic acid, such as 2-hydroxy-ethyl (meth)acrylate, hydroxypropyl (meth)acrylate, 2,3-dihydroxybutyl (meth)acrylate, 4-hydroxybutyl (meth)acrylate, polyethylene glycol mono (meth)acrylate and the like; and the compounds formed by ring-opening polymerization of said monoesters of polyhydric alcohols and acrylic or methacrylic acid, with ε-caprolactone. In particular, 4-hydroxybutyl (meth) acrylate, polyethylene glycol mono(meth)acrylate [other than the above-described monomer (C)] and the compounds formed by ring-opening polymerization of said monoesters of polyhydric alcohols and acrylic or methacrylic acid, with ε-caprolactone, show favorable reactivity. These compounds may be used either singly or in combination of more than one.

The use rate of the hydroxyl-containing polymerizable unsaturated monomers is normally 3–30% by weight, in particular, 5–25% by weight, based on the total weight of the monomers (A), (B), (C) and (D).

It is desirable for the pigment dispersing resins which are offered by the present invention to have such a resin structure that the hydrophilic portion and hydrophobic portion are divided, in respect of their stability in water and pigment dispersing ability, so that the hydrophobic portion can effectively work for dispersing (adsorbing) pigments and the hydrophilic portion, for improving stability of water-based pigment dispersion pastes or water-based paints.

Those pigment dispersing resins which are prepared according to the invention can be block-type pigment dispersing resins of regulated construction. Where methyacrylic acid is used as one of the monomeric components of the macromonomer (A), it is desirable that the macromonomer (A) to serve as the hydrophilic component and other ethylenically unsaturated monomer (D) to be copolymerized therewith, to serve as the hydrophobic component.

Accordingly, it is desirable that the other ethylenically unsaturated monomer (D) to be copolymerized with macromonomer (A) is a hydrophobic monomer. Examples of preferred monomers include C1–C24 alkyl or cyclic alkyl esters of methacrylic acid such as methyl methacrylate, ethyl methacrylate, n-propyl methacrylate, isopropyl methacrylate, n-butyl methacrylate, isobutyl methacrylate, tert-butyl methacrylate, 2-ethylhexyl methacrylate, n-octyl methacrylate, lauryl methacrylate, stearyl methacrylate, cyclohexyl methacrylate, isobomyl methacrylate and tridecyl methacrylate; styrene and vinyltoluene. In particular, styrene and derivatives thereof, methyl methacrylate and 2-ethylhexyl methacrylate are preferred.

Where methacrylic acid is not used for preparing the macromonomer (A) as one of the monomeric components, it is preferable that the macromonomer (A) is made the hydrophobic component and the ethylenically unsaturated monomer (D) to be copolymerized therewith, the hydrophilic component.

In that case, it is desirable that the other ethylenically unsaturated monomer (D) to comprise not only such hydrophobic monomer(s) as named above, but also hydrophilic monomer(s). Examples of useful hydrophilic polymerizable unsaturated monomer include carboxyl-containing polymerizable unsaturated monomers such as methacrylic acid and (meth)acrylamide and derivatives thereof such as methacrylamide, N-methylolmethacrylamide, N-methylolmethacrylamide methyl ether and N-methylolmethacrylamide butyl ether.

Copolymerization:

The copolymerization of macromonomer (A), ionic functional group-containing polymerizable unsaturated monomer (B), polyoxyalkylene chain-containing polymerizable unsaturated monomer (C) and other ethylenically unsaturated monomer (D) can be preformed, for example, following a radical polymerization process known per se, by copolymerizing macromonomer (A) and monomers (B), (C) and (D) in the presence of a radical polymerization initiator, by means of solution polymerization in an organic solvent or emulsion polymerization in an aqueous medium.

The radical polymerization initiator can be suitably selected from those earlier named as radical polymerization initiators useful for the preparation of macromonomer (A).

The copolymerization ratio of the macromonomer (A), ionic functional group-containing polymerizable unsaturated monomer (B), polyoxyalkylene chain-containing polymerizable unsaturated monomer (C) and other ethylenically unsaturated monomer (D) is not subject to any strict limitation, but is variable depending on the desired properties for the resultant resin. Whereas, it is generally desirable that these four monomers (A), (B), (C) and (D) are within the following ranges, based on the combined weight of these four monomers, the percentages being by weight:

macromonomer (A); 5–70%, preferably 10–60%, inter alia, 10–50%, monomer (13); 0.1–20%, preferably 0.5–15%, inter alia, 0.5–12%, monomer (C); 1–40%, preferably 3–30%, inter alia, 3–25%, monomer (D); 20–90%, preferably 30–80%, inter alia 35–75%.

Thus obtained pigment dispersing resin I can have a weight-average molecular weight within a range of 3,000–100,000, preferably 3,000–70,000, inter alia, 5,000–35,000; and a resin acid value within a range of 10–200 mgKOH/g, preferably 10–150 mgKOH/g, inter alia, 20–100 mgKOH/g.

Pigment dispersing resin I which is offered according to the present invention exhibits improved adsorbability onto pigment surfaces because it contains monomer (B) as copolymerized therein, and whereby can prevent agglomeration of pigment particles in aqueous dispersions or water-based paints, to impart stable dispersibility. The resin I furthermore exhibits surface-activating ability attributable to monomer (C) copolymerized therein, and not only excels in stability in aqueous dispersions, but also exhibits excellent pigment dispersing ability by preventing agglomeration of the hydrophobic portions in pigment dispersing resins, which are advantageous for wetting pigment surfaces, so that the hydrophobic portions can be effectively adsorbed onto the pigment surfaces.

Pigment dispersing resin II:

Pigment dispersing resin II according to the present invention is formed of a copolymer into which a long chain alkyl group is introduced, said copolymer being obtained by copolymerizing a high acid value, carboxyl-containing macromonomer (A-1) which is obtained by using, in the occasion of preparing the earlier described macromonomer (A), methacrylic acid as one of the monomeric components, with the ionic functional group-containing polymerizable unsaturated monomer (B), nonionic polymerizable unsaturated monomer (C) and other ethylenically unsaturated monomer (D), similarly to the case of pigment dispersing resin I, to form a copolymer (X); and further reacting said copolymer (X) with an epoxy-containing long chain alkyl compound (E).

Carboxyl-containing macromonomer (A-1):

Said carboxyl-containing macromonomer (A-1) is obtained by copolymerizing methacrylic acid with at least one copolymerizable monomer selected from the group consisting of methacrylic acid esters and styrene, in the presence of a metal complex which is a catalytic chain-transfer agent or an addition-cleavage type chain transfer agent, and if necessary a radical polymerization initiator.

The ratio of methacrylic acid to said copolymerizable monomer(s) selected from methacrylic acid esters and styrene is so selected that the resulting carboxyl-containing macromonomer (A-1) should have an acid value within a range of 50–450 mgKOH/g, preferably 65–400 mgKOHI/g, inter alia 65–325 mgKOH/g. Such ratio normally ranges 8–70%, preferably 10–60%, inter alia, 10–50% by weight, of methacrylic acid to 30–92%, preferably 40–90%, inter alia, 50–90% by weight, of the copolymerizable monomer (s), the percentages being based on the combined weight of all the monomers to be copolymerized.

So obtained macromonomer (A-1) has at least one polymerizable unsaturated bond, preferably only one polymerizable unsaturated bond, at one end of its molecule. From the standpoints of aqueous dispersion stability, pigment dispersion stability, viscosity, VOC and color number (extent of coloring) of the resin, the macromonomer (A-1) conveniently has a resin acid value within a range of 50–450 mgKOH/g, preferably 65–400 mgKOH/g, inter alia, 65–325 mgKOH/g. While the molecular weight of macromonomer (A-1) is not critical, it normally ranges, in terms of weight-average molecular weight, 300–15,000, preferably 500–10,000, in particular, 500–7,000. Copolymer (X):

The copolymerization to form copolymer (X) is performed in the identical manner with the preparation of pigment dispersing resin I, excepting that above macromonomer (A-1), in place of macro-monomer (A), is copolymerized with the monomers (B), (C) and (D).

The resulting copolymer (X) conveniently has a weight-average molecular weight normally within a range of 3,000–100,000, preferably 3,000–70,000, inter alia, 5,000–35,000, and a resin acid value within a range of normally 10–200 mgKOH/g, preferably 10–150 mgKOH/g, inter alia, 20–100 mgKOH/g.

Then a long chain alkyl group is introduced into the copolymer (X), utilizing an esterification reaction between the carboxyl group in the copolymer (X) and the epoxy group in the epoxy-containing long chain alkyl compound (E).

Epoxy-containing long chain alkyl compound (E):

As epoxy-containing long chain alkyl compound (E), a compound containing, per molecule, one epoxy group and at least one, preferably only one, long chain alkyl group can be used. Here the long chain alkyl group may be either linear or branched, and conveniently contains 6–24, preferably 8–20, inter alia, 8–16, carbon atoms are convenient.

Examples of such epoxy-containing long chain alkyl compounds include: 2-ethylhexylglycidyl ether, Cardura™E10 (Resolution Performance Products, a glycidyl ester of $C_9$–$C_{11}$ branched higher fatty acid).

The esterification reaction between copolymer (X) and said epoxy-containing long chain alkyl compound (E) can be performed following any ordinary method, for example, through the steps of adding an organic solvent to copolymer (X) if necessary, and reacting the same with said epoxy-containing long chain alkyl compound (E) at temperatures ranging from about 100 to about 150° C. It is preferred to use a tertiary amine such as N,N-dimethyllaurylamine or N,N-dimethyldodecylamine as a catalyst in that occasion. In this esterification reaction, it is convenient to use the epoxy-containing long chain alkyl compound (E) at a ratio of normally 2–40 parts, preferably 2–35 parts, inter alia, 5–30 parts by weight, per 100 parts by weight of the copolymer (X) (in terms of solid content).

The resulting pigment dispersing resin II can have a weight average molecular weight within a range of 3,000–100,000, preferably 3,000–70,000, inter alia 5,000–35,000, and a resin acid value within a range of normally 10–200 mgKOH/g, preferably 10–150 mgKOH/g, inter alia, 20–100 mgKOH/g.

Because this pigment dispersing resin III contains a long chain alkyl group which is useful for improving pigment-wetting property, it is particularly suitable for dispersing strongly hydrophobic pigment such as phthalocyanin blue or for preparation of pigment dispersions of high pigment concentration.

Pigment dispersing resin III:

The pigment dispersing resin III of the present invention consists of a copolymer obtained by copolymerization of macro-monomer (A-2) into which a long chain alkyl group has been introduced, with above-described ionic functional group-containing polymerizable unsaturated monomer (B), nonionic polymerizable unsaturated monomer (C) and other ethylenically unsaturated monomer (D), said macromonomer (A-2) having been prepared by subjecting the earlier described carboxyl group-containing macromonomer (A-1) to an esterification reaction with above-mentioned epoxy-containing long chain alkyl compound (E).

The quantitative ratio of the epoxy-containing long chain alkyl compound (E) to macromonomer (A-1) in said esterification reaction is not critical. Whereas, from the standpoint of pigment dispersing property, it is generally convenient to use 2–60 parts, preferably 5–50 parts, inter alia, 5–40 parts by weight of said compound (E) per 100 parts by weight of the solid component of macromonomer (A-1). It is furthermore desirable that the long chain alkyl group content of macromonomer (A-2) formed upon the esterification reaction is, on average 0.01–3, preferably 0.05–2.5, inter alia, 0.05–2, per molecule.

The esterification reaction of macromonomer (A-1) with the epoxy-containing long chain alkyl compound (E) can be performed in the manner similar to the esterification reaction between a copolymer (X) and an epoxy-containing long chain alkyl compound (E) in the course of preparing above pigment dispersing resin II.

The so obtained macromonomer (A-2) into which a long chain alkyl group has been introduced can provide the pigment dispersing resin III of the present invention, when copolymerized with earlier described ionic functional group-containing polymerizable unsaturated monomer (B), nonionic polymerizable unsaturated monomer (C) and other ethylenically unsaturated monomer (D). This copolymerization can be performed in the same manner to that of the macromonomer (A) with the above-mentioned monomers (B), (C) and (D) to prepare the pigment dispersing resin I, except that macromonomer (A-2) is used in place of macromonomer (A).

Thus obtained pigment dispersing resin III can have a weight-average molecular weight within a range of 3,000–100,000, preferably 3,000–70,000, inter alia, 5,000–35,000, and a resin acid value within a range of 10–200 mgKOH/g, preferably 10–150 mgKOH/g, in particular, 20–100 mgKOH/g.

The pigment dispersing resin III contains a long chain alkyl group which is useful for improving pigment wetting property, similarly to pigment dispersing resin II, and therefore is particularly suitable for dispersing strongly hydrophobic pigment or preparing high concentration pigment dispersions.

Pigment dispersing resin IV:

The pigment dispersing resin IV of the present invention consists of a copolymer obtained by copolymerization of macromonomer (A-3), which is obtained through an esterification reaction of earlier described carboxyl-containing macromonomer (A-1) with an epoxy-containing polymerizabe unsaturated compound (F) so that polymerizable unsaturated group(s) is (are) introduced into said macromonomer (A-1), with above-described ionic functional group-containing polymerizable unsaturated monomer (B), nonionic polymerizable unsaturated monomer (C) and other ethylenically unsaturated monomer (D).

Epoxy-containing polymerizable unsaturated compound (F):

The epoxy-containing polymerizable unsaturated compound (F) is a component for introducing polymerizable unsaturated group(s) into the carboxyl-containing macromonomer (A-1), utilizing the esterification reaction between the carboxyl group in macromonomer (A-1) and the epoxy group in the compound (F). The compound preferably contains, per molecule, one each of epoxy group and polymerizable unsaturated group (e.g., an ethylenic double bond).

Examples of such epoxy-containing unsaturated compound (F) include: glycidyl (meth)acrylate, 3,4-epoxycyclohexyl (meth)-acrylate, β-methylglycidyl (meth) acrylate and allylglycidyl ether. Of those, glycidyl methacrylate is preferred.

The quantitative ratio of the epoxy-containing unsaturated compound (F) to macromonomer (A-1) in said esterification reaction is not strictly limited. Whereas, from the standpoints of controlling the molecular weight of the ultimately formed resin and inhibition of viscosity increase or gelation of the copolymerization reaction system with the monomers (B), (C) and (D), it is generally convenient to use 0.5–15 parts, preferably 1–10 parts, inter alia, 1–8 parts by weight, of the epoxy-containing unsaturated compound (F), per 100 parts by weight of the solid component of macromonomer (A-1). It is furthermore desirable that the total amount of the polymerizable unsaturated groups in the macromonomer (A-3) formed through said esterification reaction is 0.005–2.5 mol, preferably 0.01–2.0 mol, inter alia, 0.01–1.6 mol, per 1 kg of the macromonomer (A-1).

The esterification reaction of macromonomer (A-1) with the epoxy-containing unsaturated compound (F) can be performed in the normal manner, for example, by adding an organic solvent to macromonomer (A-1) if necessary, and reacting the same with said epoxy-containing unsaturated compound (F) at temperatures ranging from about 100 to about 150° C. It is desirable in that occasion to use a tertiary amine such as N,N-dimethyllaurylamine or N,N-dimethyl-dodecylamine as catalyst and concurrently a polymerization inhibitor such as 4-tert-butylpyrocatechol.

Copolymerization:

The so obtained macromonomer (A-3) into which a polymerizable unsaturated group(s) are introduced can provide a pigment dispersing resin IV of the invention, upon copolymerization with the earlier described ionic functional group-containing polymerizable unsaturated monomer (B), nonionic polymerizable unsaturated monomer (C) and other ethylenically unsaturated monomer (D). This copolymerization can be performed in the same manner to that of the macromonomer (A) with the above mentioned monomers (B), (C) and (D) to prepare the pigment dispersing resin I, except that macromonomer (A-3) is used in place of macromonomer (A).

The macromonomer (A-3) being a so called polyvinyl macromonomer into which polymerizable unsaturated group (s) are introduced, the formed copolymer takes a branched structure and its molecular weight also is large.

Thus obtained pigment dispersing resin IV can have a weight-average molecular weight within a range of 3,000–100,000, preferably 3,000–70,000, inter alia, 5,000–35,000, and a resin acid value within a range of 10–200 mgKOH/g, preferably 10–150 mgKOH/g, in particular, 20–100 mgKOH/g.

Pigment dispersing resin V:

The pigment dispersing resin V of the present invention is obtained through the steps of copolymerizing aforesaid macromonomer (A) with earlier described ionic functional group-containing polymerizable unsaturated monomer (13), nonionic polymerizable unsaturated monomer (C) and other ethylenically unsaturated monomer (D) to form a copolymer (Y), and subjecting said copolymer (Y) to an esterification with aforesaid epoxy-containing long chain alkyl compound (E).

That is, the pigment dispersing resin V has a structure of the pigment dispersing resin IV into which a long chain alkyl group is further introduced utilizing the esterification reaction between the carboxyl group in said resin IV and the epoxy group in said compound (E).

The copolymerization of macromonomer (A-3) with ionic functional group-containing polymerizable unsaturated monomer (B), nonionic polymerizable unsaturated monomer (C) and other ethylenically unsaturated monomer (D) can be performed in the identical manner with the preparation of a pigment dispersing resin I. The resulting copolymer (Y) conveniently has a weight-average molecular weight normally within a range of 3,000–100,000, preferably 3,000–70,000, inter alia, 5,000–35,000, and a resin acid value within a range of normally 10–200 mgKOH/g, preferably 10–150 mgKOH/g, inter alia, 20–100 mgKOH/g.

The esterification reaction of said copolymer (Y) with an epoxy-containing long chain alkyl compound (E) can be performed in the manner similar to the esterification reaction between a copolymer (X) and an epoxy-containing long chain alkyl compound (E) in the course of preparing above pigment dispersing resin II. In this esterification reaction, it is convenient to use the epoxy-containing long chain alkyl compound (E) at a ratio of normally 2–40 parts, preferably 2–35 parts, inter alia, 5–30 parts by weight, per 100 parts by weight of the copolymer (Y) (in terms of solid content).

The resulting pigment dispersing resin IV can have a weight average molecular weight within a range of 3,000–100,000, preferably 3,000–70,000, inter alia 5,000–35,000, and a resin acid value within a range of normally 10–200 mgKOH/g, preferably 10–150 mgKOH/g, inter alia, 20–100 mgKOH/g.

The pigment dispersing resin V contains a long chain alkyl group which is useful for improving pigment wetting property, similarly to pigment dispersing resin II, and therefore is particularly suitable for dispersing strongly hydrophobic pigment or preparing high concentration pigment dispersions.

Pigment dispersing resin VI:

The pigment dispersing resin VI of the present invention consists of a copolymer of a macromonomer (A-4), into which a polymerizable unsaturated group and long chain alkyl group have been introduced, with earlier described ionic functional group-containing polymerizable unsaturated monomer (B), nonionic polymerizable unsaturated monomer (C) and other ethylenically unsaturated monomer (D), said macromonomer (A-4) having been obtained through an esterification reaction of earlier described carboxyl-containing macromonomer (A-1) with an epoxy-containing polymerizable unsaturated compound (F) and an epoxy-containing long chain alkyl compound (E).

Said esterification among the macromonomer (A-1) and the compounds (E) and (F) can be performed in the manner as earlier described, in which occasion the compounds (E) and (F) may be reacted with macromonomer (A-1) either simultaneously or sequentially in any optional order.

The quantitative ratios of the compounds (E) and (F) to macromonomer (A-1) are not critical. Whereas, from the standpoints of suitable molecular weight of the formed resin and its pigment dispersing property, it is convenient to use them within the ranges of, per 100 parts by weight of the solid content of the used macromonomer (A-1), compound (E): normally 2–60, preferably 5–50, inter alia, 5–40, parts by weight, and compound (F): normally 0.515, preferably 1–10, inter alia 1–8, parts by weight.

Also said macromonomer (A-4) obtained by this esterification desirably contains 0.005–2.5 mols, preferably 0.01–2.0 mols, inter alia, 0.01–1.6 mols of polymerizable unsaturated groups, per 1 kg of the macromonomer (A-4).

Said copolymerization of macromonomer (A-4) with ionic functional group-containing polymerizable unsaturated monomer (B), nonionic polymerizable unsaturated monomer (C) and other ethylenically unsaturated monomer (()) can be performed in the same manner to that of the macromonomer (A) with said monomers (B), (C) and (D) except that macromonomer (A-4) is used in place of macromonomer (A).

Thus obtained pigment dispersing resin VI has a weight-average molecular weight within a range of 3,000–100,000, preferably 3,000–70,000, inter alia, 5,000–35,000, and a resin acid value within a range of 10–200 mgKOH/g, preferably 10–150 mgKOH/g, inter alia, 20–100 mgKOH/g.

Water-based pigment dispersions:

Those pigment dispersing resins as above described show little expansion in solvent probably because they have blocked structures. This is a very substantial advantage over straight chain (random) resins or graft resins, particularly for making low viscosity pigment paste. Again as aforesaid, because they are structure-regulated polymers divided into hydrophobic part and hydrophilic part, they exhibit markedly excelling pigment dispersing property (color developing property).

Furthermore, those pigment dispersing resins II, III, V and VI, into which long chain alkyl groups are introduced, excel in pigment wetting property and are useful for preparing high concentration pigment dispersions without inviting objectionable increase in their viscosity.

Those pigment dispersing resins IV–VI have branched resin structures and are more apt to be branched or to have higher molecular weight than the pigment dispersing resins I–III, and hence can enhance the action of steric repelling layer to prevent agglomeration of pigment. This is advantageous for pigment dispersing property (color developing property). Whereas, a higher molecular weight leads to a higher viscosity and in this respect those resins are somewhat inferior to the other pigment dispersing resins I–III, for providing high concentration pigment dispersions (i.e., reduction of VOC).

As above, those pigment dispersing resins of the present invention are useful for preparing pigment dispersions.

A pigment dispersion can be prepared by blending, with at least one of the pigment dispersing resins of the invention, pigment, aqueous medium and a basic neutralizer, and if necessary a dispersion assistant and the like.

Examples of pigment include: bright pigments such as aluminium powder, copper powder, nickel powder, stainless steel powder, chromium powder, micaceous iron oxide, titanium dioxide-coated mica powder, iron oxide-coated mica powder and bright graphite; organic red pigments such as Pink EB, azo- and quinacridone-derived pigments; organic blue pigments such as cyanin blue and cyanin green; organic yellow pigments such as benzimidazolone-, isoindolin- and quinophthalone-derived pigments; inorganic colored pigments such as titanium white, titanium yellow, iron red, carbon black, chrome yellow, iron oxide; and various calcined pigments. Blend ratios of these pigments are not subject to specific limitations, while they are normally within a range of 10–3,000, preferably 15–2,500, inter alia 15–2,000 parts, per 100 parts of a pigment dispersing resin or resins of the present invention, parts being by weight, in consideration of the pigment dispersing ability, dispersion stability and color developing property of resulting pigment dispersions.

Examples of useful aqueous medium include water and water-organic solvent mixtures formed by dissolving organic solvent such as water-soluble organic solvent in water. Useful organic solvent in such mixtures include, for example, water-soluble organic solvents such as methyl alcohol, ethyl alcohol, isopropyl alcohol, propylpropylene glycol, butyl cellosolve, propylene glycol monomethyl ether and 3-methyl-3-methoxybutanol; and difficultly water-soluble or water-insoluble organic solvents such as xylene, toluene, cyclohexanone, hexane and pentane. Those organic solvents may be used either singly or as a mixture of two or more. Water-insoluble organic solvent may be concurrently used with water-soluble organic solvent, in minor quantities. The mixing ratio of water and organic solvent is not critical, while it is desirable that the organic solvent content of the mixture does not exceed 50% by weight, in particular, 35% by weight. The blend ratio of the aqueous medium is not critical, while it is desirable that it is within a range of 50–5,000, preferably 100–3,000, inter alia, 100–2,000, parts by weight per 100 parts by weight of a pigment dispersing resin or resins of the present invention, in respect of viscosity in the occasion of dispersing the pigment, pigment dispersing ability, dispersion stability and production efficiency.

Said basic neutralizer acts to neutralize carboxyl groups in the pigment dispersing resin of the present invention to make the resin water-soluble or water-dispersible. Specific examples include inorganic bases such as ammonium hydroxide, sodium hydroxide and potassium hydroxide; and amines such as aminomethyl propanol, aminoethylpropanol, dimethylethanolamine, triethylamine, diethylethanolamine, dimethylaminopropanol and aminomethylpropanol. The use rate of such a basic neutralizer should be sufficient to render the pigment dispersing resin in individual blend composition water-soluble or water-dispersible. It is normally convenient, therefore, to use it at a rate sufficient to make the carboxyl neutralization equivalent in the pigment dispersing resin of the invention 0.3–1.5, preferably 0.4.–1.3.

As examples of dispersion assistant to be used if necessary, Disperbyk™ 184 or 190 (BYK-Chemie Co.) may be named. Other usable additives include defoaming agent, antiseptic, rust-proofing agent and plasticizing agent. It is desirable that blend ratio of any of those additives does not exceed 50 parts per 100 parts of the pigment dispersing resin of the present invention, parts being by weight, in respect of pigment dispersing ability of the resin and stability of the pigment paste.

Those pigment dispersions can be formulated by homogeneously mixing and dispersing the above described constituents with a dispersing machine such as paint shaker, sand grind mill, ball mill, LMZ mill, DCP pearl mill and the like.

Water-based paint compositions:

Thus prepared pigment dispersion can be blended with binder resin for paint and suitably with other additives such as aqueous medium, fine polymer particles, curing catalyst, basic neutralizer, ultraviolet absorber, ultraviolet stabilizer, paint film surface regulating agent, antioxidant, flow property regulator, silan coupling agent and the like, and stably dispersed in the aqueous medium to provide a water-based paint composition.

Useful paint binder resins include combination of substrate resins which are normally used in the field of water-soluble or water-dispersible paint, with curing agent. Examples of such substrate resin include hydroxyl-containing acrylic resin, hydroxyl-containing polyester resin, epoxy-containing copolymer resin and carboxyl-containing high acid value resin. As examples of useful curing agent, amino resins and optionally blocked polyisocyanate compounds can be named, which can be used either singly or in combination.

As said hydroxyl-containing acrylic resin, copolymers having a weight-average molecular weight within a range of from about 2,000 to about 100,000, in particular, from 5,000 to 50,000, which are obtained by copolymerization of a hydroxyl-containing polymerizable unsaturated monomer such as 2-hydroxyethyl (meth)-acrylate with other polymerizable unsaturated monomer or monomers in the presence of a radical polymerization initiator are preferred.

As hydroxyl-containing polyester resin, those having a weight-average molecular weight within a range of from about 1,000 to about 100,000, in particular, from 1,500 to 70,000, which are obtained by condensation reaction between polyhydric alcohols such as ethylene glycol, butylene glycol, 1,6-hexanediol, trimethylolpropane and pentaerythritol, and polyvalent carboxylic acids such as adipic acid, isophthalic acid, terephthalic acid, phthahc anhydride, hexahydrophthalic anhydride and trimellitic anhydride are preferred.

As amino resins which are used as curing agent, melamine resins are used in general, in particular, methylolmelamine resins and melamine resins whose methylol groups are at least partially etherified with $C_1$–$C_4$ monohydric alcohols are suitable. While it is preferred that they be water-soluble or water-dispersible, water-insoluble ones can also be used.

As commercially available melamine resins useful for the above purpose, the following may be named for example: butyl etherified melamine resins such as U-van™ 20SE-60 and 225 (Mitsui Chemical, Co.), Super Beckamine™ G840 and G821 (Dainippon Ink & Chemicals, Inc.); methyl etherified melamine resins such as Sumimal™ M-100, M-40S and M-55 (Sumitomo Chemical Co., Ltd.), Cymel™ 303, 325, 327, 350 and 370 (Mitsui Cytec Co., Ltd.), Nika-lactm MS17 and MS15 (Sanwa Chemical Co., Ltd.) and Resimine™ 741 (Monsanto Co.); methyl- and iso-butyl-mixed etherified melamine resins such as Cymel™ 235, 202, 238, 254, 272 and 1130 (Mitsui Cytec Co., Ltd.), and Sumimal™ M66B (Sumitomo Chemical Co., Ltd.); and methyl- and n-butyl-mixed etherified melamine resins such as Cymel™ XV805 (Mitsui Cytec Co., Ltd.) and Nikalac™ MS95 (Sanwa chemical Co., Ltd.).

Said optionally blocked polyisocyanate compounds usable as the curing agent include both of polyisocyanate compounds having free isocyanate groups and those in which isocyanate groups are blocked.

Examples of polyisocyanate compounds having free isocyanate groups include organic polyisocyanates per se, e.g., aliphalic diisocyanates such as hexamethylenediisocyanate and trimethylhexamethylenediisocyanate; cycloaliphatic diisocyanates such as hydrogenated xylylenediisocyanate and isophoronediisocyanate; aromatic diisocyanates such as tolylenediisocyanate and 4,4'-diphenylmethane-diisocyanate; and polyisocyanate compounds having no less than 3 isocyanate groups such as triphenylmethane-4,4',4"-triisocyanate, 1,3,5-triisocyanatebenzene, 2,4,6-triisocyanatetoluene and 4,4'-dimethyldiphenylmethane-2, 2',5,5'-tetraisocyanate. Those organic polyisocyanates may be used in such forms as adducts with polyhydric alcohol, low molecular weight polyester resin, water or the like; or cyclic polymers between those organic polyisocyanates, or isocyanate biuret.

As commercially available polyisocyanate compounds having free isocyanate groups, for example, Burnock™ D-750, -800, DN-950, DN-970 and DN-15-455 (Dainippon Ink & Chemicals, Inc.); Desmodur™ L, N, HL and N3390 (Sumitomo Bayer Urethane Co., Ltd.; Takenate™ D-102, -202, -110 and -123N (Takeda Chemical Industries, Ltd.); Coronate™ EH, L, HL and 203 (Nippon Polyurethane Industry Co., Ltd.); and Duranate™ 24A-9OCX (Asahi Chemical Industry Co., Ltd.) may be named.

As polyisocyanate compounds in which isocyanate groups are blocked, those formed by blocking isocyanate groups in the above-described polyisocyanate compounds having free isocyanate groups, with a known blocking agent such as oxime, phenol, alcohol, lactam, malonic acid ester or mercaptane can be used. Typical commercially available polyisocyanate compounds whose isocyanate groups are blocked include Burnock™ D-550 (Dainippon Ink & Chemicals, Inc.), Takenate™ B-815-N (Takeda Chemical Industries, Ltd.), Additol™ VXL-80 (Hoechst AG, Germany), Coronate™ 2507 (Nippon Polyurethane Industry Co., Ltd.) and Desmodur™ N3500 (Sumitomo Bayer Urethane Co., Ltd.).

The aqueous medium which is used when necessity arises can be suitably selected from those useful for preparing the pigment dispersions as earlier explained.

The fine polymer particles are provided by a polymer which does not dissolve in water-based paint compositions of the present invention but disperses as fine particles. Suitable average particle size normally is within a range of 0.01–1 μm, preferably 0.05–0.8 μm. Inside of the particles may either be crosslinked or not, the former being preferred. As such fine polymer particles, those known per se as flow property regulator in the field of paint can be used.

Where an optionally blocked polyisocyanate compound is used as the curing agent, organometal catalysts such as dibutyltin diacetate, dibutyltin dioctate, dibutyltin dilaurate and the like; and amines such as triethylamine, diethanolamine and the like can be conveniently used as the curing catalyst. Whereas, an amino resin such as melamine resin is used as the curing agent, such curing catalyst as sulfonic acid compound, e.g., paratoluenesulfonic acid, dodecylbenzensulfonic acid and dinonylnaphthalenesulfonic acid; or amine-neutralization products of these sulfonic acid compounds are conveniently used.

As examples of ultraviolet absorber, benzophenone, benzotriazole, cyanoacrylate, salicylate and oxalic acid anilide compounds may be named. As the ultraviolet stabilizer, hindered amine compounds can be used.

The water-based paint compositions according to the invention are useful as coloring paint compositions (including metallic paint and iridescent paint) into which various pigments such as coloring pigments, metallic pigments and iridescent pigments are blended. In particular, they can be conveniently used for automotive finish.

The paint compositions according to the invention can be applied onto various object matters to be coated (painted), following the practice known per se, and can form cured coating film when baked normally at temperatures of from about 80° C. to about 180° C., for about 10–60 minutes. Where a short time baking is desired, for example, a cured coating film can be formed by baking under such conditions as will attain the highest temperature of from about 180° C. to about 250° C. of the material being baked, for about 20–about 60 seconds.

The matters to be painted with the paint compositions of the present invention are subject to no specific limitation, examples of which including metallic substrate such as steel sheet, aluminium, tin and the like; other substrate such as of mortar, cement, plastics, glass and the like; and those substrates which have been surface treated and/or applied with coating film. In particular, metallic substrates and plastic substrates are suitable for use.

Examples of steel sheet include cold-rolled steel sheet, molten galvanized steel sheet, electrogalvanized steel sheet, aluminum plated steel sheet, stainless steel sheet, copper plated steel sheet, tin plated steel sheet, lead-tin alloy plated steel sheet (turn sheet); steel sheet plated with zinc alloy such as iron-zinc, aluminium-zinc, nickel-zinc alloys and the like. As surface-treated steel sheet, for example, steel sheet which is given a chemical treatment such as phosphate treatment, chromate treatment and the like may be named.

As the substrate on which coating film has been formed, a substrate which has been optionally surface treated and thereafter primer-coated, or said substrate which is further applied with an inter-coat can be used.

When a paint composition according to the present invention is used for automotive finish, typical object matters to be coated include: a chemically treated steel sheet which is further electro-deposition-coated with primer and optionally applied with an inter coat thereon; various plastic substrates (which have been optionally surface treated, brimer-coated or further applied with an inter coat); and composite members which are combination of the foregoing.

The electrodepositing paint for electrodeposition coating may be anionic or cationic, cationic type being preferred because of good corrosion resistance. As cationic electrodeposition paint, any of those known per se can be used. For example, those containing as the resin component a base resin having hydroxyl groups and cationic groups and as the curing agent a blocked polyisocyanate compound can be conveniently used.

The water-based paint compositions according to the present invention are conveniently used for colored coating film-forming compositions for 1-coat-1-bake finish of object substrates, and for top coating colored base paint compositions in 2-coat-1-bake (2C1B), 2-coat-2-bake (2C2B), 3-coat-1-bake (3C1B), 3-coat-2-bake (3C2B), or 3-coat-3-bake (3C3B) systems.

Where the paint compositions according to the present invention are used for colored top coating for automobiles, the top coat can be formed through the steps of, applying the paint composition onto a primer film such as an electrodeposited coating film or onto an uncured or cured inter coat applied onto such a primer film, by such means as electrostatic coating (bell-type or the like) or aerosol coating, to a dry film thickness of normally from about 10 to about 60 $\mu$m; and allowing it to stand for several minutes at room temperature, or forcedly drying the film for several minutes at temperatures ranging from about 50° to about 80° C.; thereafter applying a clear top coat paint thereon; and baking the same at temperatures of from about 120° to about 180° C. normally for about 10–about 60 minutes. It is also possible to apply a clear top coating paint onto the uncured or cured colored top coat film, by such means as electrostatic coating (bell-type or the like) or aerosol coating, to a dry film thickness of normally from about 20 to about 100 $\mu$m followed by curing, to form multi-layered top coating film.

As such clear top coating paint to be applied onto the above-described colored top coat, those conveniently used are clear top coating paints comprising at least one base resin having a cross-linkable functional group (e.g., hydroxyl, epoxy, carboxyl, alkoxysilane group and the like) such as acrylic, vinyl, polyester, alkyd and urethane resins; and at least one crosslinking agent for crosslinking and curing the base resin, such as alkyletherified melamine resin, urea resin, guanamine resin, optionally blocked polyisocyanate compound, epoxy resin and carboxyl-containing compound. In such clear top coating paint, convenient blend ratio of the base resin and the cross-linking agent is, based on the sum of the two components, normally 50–90% by weight of the base resin component and 10–50% by weight of the cross-linking agent component.

The form of such clear top coating paint is subject to no specific limitation and it can take any desired form such as organic solvent type, non-aqueous liquid dispersion type, aqueous solution type, aqueous dispersion (slurry) type, high solid type or powder type.

Hereinafter the invention is explained in further details, referring to production examples, working examples and comparative examples, in which parts and percentages are by weight unless other-wise specified.

Production of macromonomers

Production Example 1

An ordinary reaction vessel for producing acrylic resins, equipped with a stirrer, thermometer, nitrogen-inlet pipe and a reflux condenser was charged with 105 parts of methoxypropanol which was heated under stirring while nitrogen substitution of inside atmosphere of the reaction vessel was under progress, to maintain a temperature of 105° C. Into the vessel then a mixture of 70 parts of methyl methacrylate, 30 parts of methacrylic acid, 1 part of azobisiso-butyronitrile, 5 parts of methoxypropanol and 0.03 part of bis(borondifluorodimethyl glyoxymate)Co (II) was added dropwise over a period of 3 hours. After the dropping ended, the system was aged for 30 minutes at 105° C. Further an additional catalytic liquid mixture consisting of 10 parts of methoxypropanol and 0.5 part of azobisiso-butyronitrile was added to the system dropwise over a period of an hour, followed by an hour's aging at 105° C. and cooling. Thus, a macromonomer solution having a solid content of 45% was obtained. Said macromonomer (a-1) had a resin acid value of about 195 mgKOH/g and a weight-average molecular weight of about 1,800.

Production Examples 2–4

Production Example 1 was repeated except that the composition of blended components was varied for each run as indicated in the following Table 1, to obtain solutions of macromonomers (a-2), (a-3), (ac-1) and (ac-2). The solid content of each macromonomer solution, resin acid value and weight-average molecular weight of each macromonomer were as shown in Table 1.

TABLE 1

|  | Production Example | | | |
| --- | --- | --- | --- | --- |
|  | 1 | 2 | 3 | 4 |
| Macromonomer | a-1 | a-2 | a-3 | a-4 |
| Initially charged methoxypropanol (part) | 105 | 90 | 72 | 72 |
| Methyl methacrylate (part) | 70 | 60 | 95 | 70 |
| n-Butyl methacrylate (part) |  |  |  | 30 |
| Methacrylic acid (part) | 30 | 40 | 5 |  |
| Azobisisobutyronitrile (part) | 1 | 1 | 1 | 1 |
| Bis(borondifluorodimethyl glyoxymate)Co (II) (part) | 0.03 | 0.045 | 0.008 | 0.005 |
| Added catalytic liquid mixture — methoxypropanol (part) | 10 | 10 | 10 | 10 |
| Added catalytic liquid mixture — azobisisobutyronitrile (part) | 0.5 | 0.5 | 0.5 | 0.5 |
| Characteristics — solid content (%) | 45 | 42 | 55 | 55 |
| Characteristics — resin acid value (mg KOH/g) | 195 | 260 | 32 | 0 |
| Characteristics — weight-average molecular weight | 1800 | 1900 | 1800 | 2000 |

Preparation of macromonomers having polymerizable unsaturated groups introduced therein Production Example 5

An ordinary reaction vessel for producing acrylic resins, equipped with a stirrer, thermometer, air inlet pipe and a reflux condenser was charged with 222.2 parts of the macromonomer (a-1) solution obtained in the foregoing Production Example 1 and 6.8 parts of methoxypropanol and while air-substitution inside the reaction vessel was being conducted, the charged content was heated under stirring and maintained at 120° C. Into the vessel 0.05 part of 4-t-butylpyrocatechol, 0.1 part of N,N-dimethylaminoethanol and 5.4 parts of glycidyl methacrylate were added and reacted at 120° C. for 2 hours, to provide a solution of a macromonomer (b-1) into which polymerizable unsaturated group were introduced. The solid content of the solution was 45%, and the macromonomer (b-1) had a resin acid value of about 175 mgKOH/g and a weight-average molecular weight of about 1,900.

Production Examples 6–8

Production Example 5 was repeated except that the composition of blended components was varied for each run as indicated in the following Table 2, to provide solutions of macromonomers (b-2), (b-3) and (b-4), said macromonomers having introduced therein polymerizable unsaturated groups by the esterification reaction. The solid contents of those macromonomer solutions and resin acid values and weight-average molecular weights of the macromonomers were as shown in Table 2.

TABLE 2

|  | Production Example | | | |
| --- | --- | --- | --- | --- |
|  | 6 | 7 | 8 | 9 |
| Polymerizable unsaturated group introduced macromonomer | b-1 | b-2 | b-3 | b-4 |
| Macromonomer solution  kind | a-1 | a-1 | a-2 | a-3 |
| Macromonomer solution  amount (part) | 222.2 | 222.2 | 238.1 | 181.8 |
| Methoxypropanol (part) | 6.8 | 3.3 | 7.4 | 2.3 |
| 4-t-Butylpyrocatechol (part) | 0.05 | 0.05 | 0.05 | 0.05 |
| N,N-dimethylaminoethanol (part) | 0.1 | 0.1 | 0.1 | 0.1 |
| Glycidyl methacrylate (part) | 5.4 | 2.7 | 5.4 | 2.7 |
| Characteristics  solid content (%) | 45 | 45 | 42 | 55 |
| Characteristics  resin acid value (mg KOH/g) | 175 | 185 | 240 | 22 |
| Characteristics  weight-average molecular weight | 1900 | 1900 | 2000 | 2000 |

Preparation of pigment dispersing resins (Part 1)

EXAMPLE 1

An ordinary reaction vessel for producing acrylic resins, equipped with a stirrer, thermometer and a reflux condenser was charged with 32 parts of ethylene glycol monobutyl ether and 44.4 parts of macromonomer (a-1) solution (20 parts as solid) which was obtained in Production Example 1. The content in the vessel was heated under stirring and maintained at 110° C. Into the system a mixture of 10 parts of styrene, 43 parts of methyl methacrylate, 15 parts of n-butyl methacrylate, 5 parts of 2-hydroxyethyl methacrylate, 2 parts of dimethylaminoethylmethacrylate, 5 parts of BISO-MER™ PEM6E (Dai-ich Kogyo Seiyaku Co., Ltd., polyethylene glycol monomethacrylate having a molecular weight of about 350), 1 part of azobisisobutyronitrile and 5 parts of isobutyl alcohol was added dropwise over a period of 3 hours, followed by 30 minutes' aging at 110° C. Then an additional catalytic liquid mixture of 20 parts of ethylene glycol monobutyl ether and 0.5 part of azobisisobutyronitrile was added dropwise over a period of 1 hour, followed by an hour's aging at 110° C. and cooling. Thus a pigment dispersing resin (A-1) solution having a solid content of 55% was obtained. Said resin (A-1) had a resin acid value of about 39 mgKOH/g and a weight-average molecular weight of about 5,500.

EXAMPLES 2–10 and

Comparative Examples 1–5

Example 1 was repeated except that the composition of the used components was varied for each run as shown in the following Table 3, to provide solutions of pigment dispersing resins (A-2) to (A-10) according to the present invention and pigment dispersing resins (AC-1) to (AC-5) as products for comparison. The solid contents of those solutions and resin acid values and weight-average molecular weights of those resins were as shown in the same Table 3.

TABLE 3

| | Example | | | | | | | |
|---|---|---|---|---|---|---|---|---|
| | 1 | 2 | 3 | 4 | 5 | 6 | 7 | 8 |
| Pigment dispersing resin solution | A-1 | A-2 | A-3 | A-4 | A-5 | A-6 | A-7 | A-8 |
| Ethylene glycol monobutyl ether | 32 | 39 | 39 | 41 | 41 | 36 | 45 | 45 |
| Macromonomer solution  kind | a-1 | a-1 | a-1 | a-2 | a-2 | a-2 | a-3 | a-4 |
| Macromonomer solution  amount (solid part) | 20 | 20 | 20 | 15 | 15 | 15 | 20 | 20 |
| Styrene (part) | 10 | 10 | 10 | 10 | 10 | 10 | 10 | 10 |
| methyl methacrylate (part) | 43 | 43 | 43 | 38 | 36 | 38 | 24 | 29 |
| n-butyl methacrylate (part) | 15 | 15 | 15 | | | | 15 | 15 |
| 2-ethylhexyl methacrylate (part) | | | | 20 | 20 | 20 | | |
| Lauryl methacrylate (part) | | | | | | | 10 | |
| 2-hydroxyethyl methacrylate (part) | 5 | 5 | 5 | 10 | 10 | 10 | 10 | 10 |
| Methacrylic acid (part) | | | | | | | 5 | 5 |
| Dimethylaminoethyl methacrylate (part) | 2 | 2 | 2 | 2 | | | 1 | 1 |
| Methacryloyloxyethyl trimethylammonium chloride (part) | | | | | 4 | | | |
| 2-Acrylamide-2-methylsulfonic acid (part) | | | | | | 2 | | |
| NF BISOMER ™ PEM6E (part) | 5 | | | 5 | 5 | 5 | 5 | 10 |
| NF BISOMER ™ S10W (*1) (part) | | 5 | | | | | | |
| NF BISOMER ™ S20W (*2) (part) | | | 5 | | | | | |
| Cardura ™ E10 (*3) (part) | | | | | | 5 | | |
| Deionized water (part) | | | | | | | | |
| Azobisisobutyronitrile (part) | 1 | 1 | 1 | 1 | 1 | 1 | 1 | 1 |
| Isobutyl alcohol (part) | 5 | 5 | 5 | 5 | 5 | 5 | 5 | 5 |
| Additional catalytic liquid mixture  ethylene glycol monobutyl ether (part) | 20 | 20 | 20 | 15 | 15 | 15 | 15 | 15 |
| Additional catalytic liquid mixture  azobisisobutyronitrile (part) | 0.5 | 0.5 | 0.5 | 0.5 | 0.5 | 0.5 | 0.5 | 0.5 |
| Characteristics  solid content (%) | 55 | 55 | 55 | 55 | 55 | 55 | 55 | 55 |
| Characteristics  resin acid value (mg KOH/g) | 39 | 39 | 39 | 39 | 39 | 39 | 38 | 32 |
| Characteristics  weight-average molecular weight | 5500 | 6100 | 6600 | 8500 | 8200 | 8800 | 5500 | 5800 |

| | Example | | Comparative Example | | | | |
|---|---|---|---|---|---|---|---|
| | 9 | 10 | 1 | 2 | 3 | 4 | 5 |
| Pigment dispersing resin solution | A-9 | A-10 | AC-1 | AC-2 | AC-3 | AC-4 | AC-5 |
| Ethylene glycol monobutyl ether | 31 | 34 | 33 | 33 | 42 | 75 | 31 |
| Macromonomer solution  kind | a-1 | a-2 | a-1 | a-1 | — | — | a-1 |
| Macromonomer solution  amount (solid part) | 30 | 25 | 20 | 20 | | | 30 |
| Styrene (part) | 10 | 10 | 10 | 10 | 20 | 20 | |
| methyl methacrylate (part) | 23 | 33 | 35 | 20 | 48 | 48 | 15 |
| n-butyl methacrylate (part) | | 10 | 15 | 10 | 15 | 15 | 15 |
| 2-ethylhexyl methacrylate (part) | 10 | | | | | | |
| Lauryl methacrylate (part) | | | | | | | |
| 2-hydroxyethyl methacrylate (part) | 10 | 10 | 5 | 10 | 10 | 10 | 10 |
| Methacrylic acid (part) | | | | | | | |
| Dimethylaminoethyl methacrylate (part) | 2 | 2 | 15 | | 2 | 2 | 25 |
| Methacryloyloxyethyl trimethylammonium chloride (part) | | | | | | | |
| 2-Acrylamide-2-methylsulfonic acid (part) | | | | | | | |
| NF BISOMER ™ PEM6E (part) | 5 | 5 | | 30 | 5 | 5 | 5 |
| NF BISOMER ™ S10W (*1) (part) | | | | | | | |
| NF BISOMER ™ S20W (*2) (part) | | | | | | | |
| Cardura ™ E10 (*3) (part) | 10 | 10 | | | | | |
| Deionized water (part) | | | | | | | |
| Azobisisobutyronitrile (part) | 1 | 1 | 1 | 1 | 6 | 1 | 3 |
| Isobutyl alcohol (part) | 5 | 5 | 5 | 5 | 5 | 5 | 5 |
| Additional catalytic liquid mixture  ethylene glycol monobutyl ether (part) | 15 | 15 | 20 | 20 | 20 | 20 | — |
| Additional catalytic liquid mixture  azobisisobutyronitrile (part) | 0.5 | 0.5 | 0.5 | 0.5 | 0.5 | 0.5 | — |
| Characteristics  solid content (%) | 55 | 55 | 55 | 55 | 60 | 50 | gellated |

TABLE 3-continued

| teristics | resin acid value (mg KOH/g) | 39 | 45 | 30 | 30 | 35 | 35 |
|---|---|---|---|---|---|---|---|
| | weight-average molecular weight | 5700 | 5100 | 13,000 | 4500 | 7200 | 32,000 |

(*1) BISOMER ™ S10W: methoxypolyethylene glycol mono-methacrylate diluted with water to 50% concentration; Dai-ich Kogyo Seiyaku Co., Ltd.; molecular weight, about 1080
(*2) BISOMER ™ S20W: methoxypolyethylene glycol mono-methacrylate diluted with water to 50% concentration; Dai-ich Kogyo Seiyaku Co., Ltd.; molecular weight, about 2080
(*3) Cardura ® E10: glycidyl ester of $C_9$–$C_{11}$ branched higher fatty acid; Resolution Performance Products.

Preparation of pigment dispersions (Part 1)

EXAMPLES 11–23 and

Comparative Examples 6–12

Using those pigment dispersing resin solutions which were synthesized in above Examples 1–10 and Comparative Examples 1–5, pigment, neutralizing amine (N,N-dimethylaminoethanol) and deionized water, pigment dispersions were prepared each having the composition as shown in the following Table 4. Each blend was put in a wide-mouthed glass bottle of 225 cc in capacity and to which glass beads of about 1.3 mm in diameter each were added as a dispersing medium. The bottle was sealed and the content was dispersed with a paint shaker for 4 hours. Thus water-based pigment dispersions (B-1) to (B-16) and (BC-1) to (BC-7) were obtained.

Performance tests of those water-based pigment dispersions which were obtained in above Examples 11–23 and Comparative Examples 6–12 were conducted by the following methods, with the results as shown in Table 4.

<Test methods>

Appearance of coated film:

Each of the pigment dispersion paste was applied onto a 100×200 mm transparent PET film with a bar coater to a dry film thickness of 15 μm, and baked at 140° C. for 15 minutes. The extent of turbidity of the coating on the PET film was visually evaluated according to the following grading standard:

○: uniform and perfectly free of turbidity

Δ: slightly turbid

X: considerably turbid.

Gloss:

Each pigment dispersion was applied onto the PET film with a doctor blade (5 mils, 125 μm) and dried. The gloss of the formed coating was determined by measuring its 60° mirror surface reflectivity following JIS K5400 7.6 (1990).

Light transmission:

Each pigment dispersion was applied onto the PET film with a doctor blade (4 mils, 125 μm) and dried. The percent transmission of the formed coating was measured with a turbidimeter (COH-300) following the equation below to evaluate transparency:

light transmission (%)=100×[1-(scattered light intensity/radiated light intensity)]

Viscoelasticity characteristics:

Viscosity [Pascal.sec (Pa.sec.)] and yield point (dyn/cm²) were measured with a dynamic viscoelasticity measuring apparatus, MR-300 (Rheology Co.).

TABLE 4

| | | | Example | | | | | | | |
|---|---|---|---|---|---|---|---|---|---|---|
| | | | 11 | 12 | 13 | 14 | 15 | 16 | 17 | 18 |
| Pigment dispersion | | | B-1 | B-2 | B-3 | B-4 | B-5 | B-6 | B-7 | B-8 |
| Acrylic resin | kind | | A-1 | A-1 | A-1 | A-1 | A-2 | A-3 | A-4 | A-5 |
| solution | amount (part) | | 181.8 | 181.8 | 181.8 | 181.8 | 181.8 | 181.8 | 181.8 | 181.8 |
| Pigment | RT 355D* (part) | | 100 | | | | | 100 | 100 | 100 | 100 |
| | G 314** (part) | | | 100 | | | | | | |
| | MT500HD*** (part) | | | | 200 | | | | | |
| | Raven 5000 UIII**** (part) | | | | | 20 | | | | |
| N,N-dimethylaminoethanol (part) | | | 3.1 | 3.1 | 3.1 | 3.1 | 3.1 | 3.1 | 3.1 | 3.1 |
| Deionized water (part) | | | 327.2 | 327.2 | 327.2 | 327.2 | 327.2 | 327.2 | 327.2 | 327.2 |
| Test result | coated film appearance | | ○ | ○ | ○ | ○ | ○ | ○ | ○ | ○ |
| | gloss (60°) | | 93 | 94 | 88 | 87 | 91 | 92 | 93 | 96 |
| | light transmission (%) | | 90 | 92 | 78 | — | 90 | 91 | 91 | 94 |
| | visocisty (Pa · sec) | | 1.1 | 1.3 | 0.9 | 1.4 | 1.2 | 0.8 | 2.1 | 1.9 |
| | yield point(dyn/cm²) | | 3.8 | 4.2 | 3.1 | 4.6 | 6.5 | 5.4 | 6.5 | 5.7 |

| | | | Example | | | | | | | |
|---|---|---|---|---|---|---|---|---|---|---|
| | | | 19 | 20 | 18 | 19 | 20 | 21 | 22 | 23 |
| Pigment dispersion | | | B-9 | B-10 | B-11 | B-12 | B-13 | B-14 | B-15 | B-16 |
| Acrylic resin | kind | | A-6 | A-7 | A-8 | A-9 | A-9 | A-9 | A-9 | A-10 |
| solution | amount (part) | | 181.8 | 181.8 | 181.8 | 181.8 | 181.8 | 181.8 | 181.8 | 181.8 |

TABLE 4-continued

|  |  |  |  |  |  |  |  |  |  |
|---|---|---|---|---|---|---|---|---|---|
| Pigment | RT 355D* (part) | 100 | 100 | 100 | 100 |  |  |  | 100 |
|  | G 314** (part) |  |  |  |  | 100 |  |  |  |
|  | MT500HD*** (part) |  |  |  |  |  | 200 |  |  |
|  | Raven 5000 UIII**** (part) |  |  |  |  |  |  | 20 |  |
| N,N-dimethylaminoethanol (part) |  | 3.1 | 3.1 | 3.1 | 2.6 | 3.1 | 3.1 | 3.1 | 3.6 |
| Deionized water (part) |  | 327.2 | 327.2 | 327.2 | 327.2 | 327.2 | 327.2 | 327.2 | 327.2 |
| Test result | coated film appearance | ○ | ○ | ○ | ○ | ○ | ○ | ○ | ○ |
|  | gloss (60°) | 93 | 91 | 90 | 95 | 93 | 87 | 90 | 94 |
|  | light transmission (%) | 88 | 89 | 87 | 92 | 91 | 80 | — | 92 |
|  | visocisty (Pa · sec) | 1.7 | 1.5 | 1.8 | 0.9 | 1.5 | 1.5 | 1.1 | 1.2 |
|  | yield point (dyn/cm$^2$) | 5.9 | 4.2 | 4.5 | 2.8 | 2.7 | 3.5 | 4.3 | 3.9 |

|  |  | Comparative Example |  |  |  |  |  |  |
|---|---|---|---|---|---|---|---|---|
|  |  | 6 | 7 | 8 | 9 | 10 | 11 | 12 |
| Pigment dispersion |  | BC-1 | BC-2 | BC-3 | BC-4 | BC-5 | BC-6 | BC-7 |
| Acrylic resin solution | kind | AC-1 | AC-2 | AC-3 | AC-3 | AC-3 | AC-3 | AC-4 |
|  | amount (part) | 181.8 | 181.8 | 166.7 | 166.7 | 166.7 | 166.7 | 200 |
| Pigment | RT355D* (part) | 100 | 100 | 100 |  |  |  | 100 |
|  | G 314** (part) |  |  |  | 100 |  |  |  |
|  | MT500HD*** (part) |  |  |  |  | 200 |  |  |
|  | Raven 5000 UIII**** (part) |  |  |  |  |  | 20 |  |
| N,N-dimethylaminoethanol (part) |  | 2.5 | 2.5 | 2.9 | 2.9 | 2.9 | 2.9 | 2.9 |
| Deionized water (part) |  | 327.2 | 327.2 | 342.3 | 342.3 | 342.3 | 342.3 | 309 |
| Test result | coated film appearance | × | Δ | × | × | × | × | Δ |
|  | gloss (60°) | 82 | 85 | 76 | 80 | 72 | 72 | 89 |
|  | light transmission (%) | 71 | 80 | 64 | 78 | 58 | — | 85 |
|  | visocisty (Pa · sec) | 1.7 | 1.5 | 1.2 | 1.4 | 4.2 | 2.9 | 5.8 |
|  | yield point (dyn/cm$^2$) | 6.1 | 4.6 | 6.8 | 5.9 | 6.5 | 9.8 | 25 |

*RT: tradename, Cinquasia Magenta RT 355D, Ciba Specialty Chemicals, Inc., an organic red pigment
**G 314: tradename, Cyanin Blue G314, Sanyo Color Works, Ltd., an organic blue pigment
***MT500HD: tradename, TAYCA Corporation, an inorganic white pigment
****Raven 5000 UIII: tradename, Columbia Carbon Co., Ltd., carbon black pigment Synthesis Example 1

A reaction vessel for producing acrylic resins, equipped with a stirrer, thermometer and a reflux condenser was charged with 40 parts of ethylene glycol monobutyl ether and 30 parts of isobutyl alcohol, which were heated under stirring. When the temperature of the system reached 100° C., a mixture of the following monomers was added to the system dropwise, consuming 3 hours:

|  | part |
|---|---|
| styrene | 10 |
| methyl methacrylate | 38 |
| n-butyl acrylate | 25 |
| 2-hydroxyethyl methacrylate | 20 |
| acrylic acid | 7 |
| 2,2'-azobisisobutyronitrile | 1 |
| isobutyl alcohol | 5 |

After the dropwise addition was completed, the system was maintained at 100° C. for further 30 minutes, and thereafter an additional catalytic solution which was a mixture of 0.5 part of 2,2'-azobisiso-butyronitrile and 10 parts of ethylene glycol monobutyl ether was added dropwise, consuming an hour, followed by further an hour's stirring at 100° C., cooling and addition of 15 parts of isobutyl alcohol. When temperature of the system dropped to 75° C., 4 parts of N,N-dimethylaminoethanol was added, followed by 30 minutes' stirring. Thus an acrylic polymer (AP-1) solution having a solid concentration of 50% was obtained.

Synthesis Example 2

Synthesis Example 1 was repeated except that the composition of the monomeric mixture which was added dropwise was changed as indicated in Table 5, to synthesize an acrylic polymer solution (AP-2) having a solid concentration of 50%. The property values of the acrylic polymers synthesized in Synthesis Examples 1 and 2 were as shown in Table 5.

Synthesis Example 3

A reaction vessel equipped with a stirrer, thermometer, rectification column and nitrogen inlet pipe was charged with 317.8 parts of isophthalic acid, 196.5 parts of hexahydrophthalic acid, 372.6 parts of adipic acid, 268 parts of neopentyl glycol, 217.8 parts of 1,6-hexanediol and 263.5 parts of trimethylolpropane, which were heated under stirring. After the temperature reached 160° C., the system was gradually heated to 235° C. over a period of 3 hours, followed by 1.5 hours' aging. Thereafter the rectification column was switched to reflux condenser, and the reaction was conducted after introduction of 100 parts of toluene, under reflux. The reaction was continued for 6 hours at 235° C., and thereafter the toluene was removed under reduced pressure. The system was cooled to 170° C., followed by addition of 122.5 parts of trimellitic anhydride and 30 minutes' aging at 170° C. Further 322 parts of butyl cellosolve was added and the system was thereafter cooled to 80° C., 4 parts of dimethylethanol-amine was added, and the system was allowed to stand at 80° C. for 30 minutes, followed by cooling to 50° C., addition of 2600 parts of deionized water and 30 minutes' stirring. Thus a polyester resin (PP-1) solution having a solid concentration of 35% was obtained.

Synthesis Example 4

Synthesis Example 3 was repeated except that composition of the constituents was changed as shown in Table 6, to synthesize a polyester resin (PP-2) solution having a solid concentration of 35%. The resinous property values of those polyester resins obtained in Synthesis Examples 3 and 4 were as shown in Table 6.

TABLE 5

|  | Synthesis Example | |
|---|---|---|
|  | 1 | 2 |
| Acrylic polymer solution | AP-1 | AP-2 |
| Styrene (part) | 10 | 38 |
| Methyl methacrylate (part) | 38 | 10 |
| N-butyl acrylate (part) | 25 | 25 |
| 2-Hydroxyethyl methacrylate (part) | 20 | 20 |
| Acrylic acid (part) | 7 | 7 |
| 2,2'-Azobisisobutyronitrile (part) | 1 | 1 |
| Characteristics |  |  |
| solid content (%) | 50 | 50 |
| resin acid value (mgKOH/g) | 54 | 54 |
| weight-average molecular weight | 32000 | 39000 |

TABLE 6

|  | Synthesis Example | |
|---|---|---|
|  | 3 | 4 |
| Polyester polymer solution | PP-1 | PP-2 |
| Isophthalic acid (part) | 317.8 | 208.8 |
| Hexahydrophthalic acid (part) | 196.5 | 387.5 |
| Adipic acid (part) | 372.6 | 275.5 |
| Neopentyl glycol (part) | 268 | 198.1 |
| 1,6-Hexanediol (part) | 217.8 | 371.1 |
| Trimethylolpropane (part) | 263.5 | 171.7 |
| Trimellitic anhydride (part) | 122.5 | 120.8 |
| Characteristics |  |  |
| solid content (%) | 35 | 35 |
| acid value (mgKOH/g) | 56 | 55 |
| hydroxyl value (mgKOH/g) | 90 | 90 |
| weight-average molecular weight | 25000 | 28000 |

Synthesis Example 5: Synthesis of acrylic emulsion

A reaction vessel for producing acrylic resins, equipped with a stirrer, thermometer and a reflux condenser was charged with 400 parts of deionized water and 2.4 parts of Newcol™ 562SF (Nippon Nyukazai Co., Ltd., a surfactant), which were heated under stirring. When the temperature reached 82° C., a pre-emulsion forming mixture was charged, which had been prepared by mixing 6 parts of styrene, 8.5 parts of n-butyl acrylate, 0.5 part of allyl methacrylate, 0.175 part of Newcol™ 562SF and 7.5 parts of deionized water and stirring the mixture with a dissolver at about 1000 r.p.m. for 10 minutes. Twenty (20) minutes after charging said pre-emulsion forming mixture, 15 parts of deionized water and 0.54 part of potassium persulfate were added. After further 10 minutes, while the system was still maintained at 82° C., a first monomeric mixture formed by mixing 114 parts of styrene, 161.5 parts of n-butyl acrylate, 9.5 parts of allyl methacrylate, 3,325 parts of Newcol™ 562SF and 142.5 parts of deionized water, stirring the mixture with a dissolver at about 1,000 r.p.m. for 10 minutes and adding thereto 15 parts of deionized water and 0.54 part of potassium persulfate, was added dropwise over a period of 3 hours. Then after intervening standing at 82° C. for 30 minutes, a second monomeric mixture formed by mixing 50 parts of styrene, 23 parts of n-butyl acrylate, 10 parts of 2-hydroxyethyl acrylate, 5 parts of methacrylic acid, 1.6 parts of Newcol™ 562SF and 60 parts of deionized water, stirring the mixture with a dissolver at about 1,000 r.p.m. for 10 minutes and adding thereto 15 parts of deionized water and 0.54 part of potassium persulfate, was addd dropwise over a period of 1.5 hours. After the addition, the system was maintained at 82° C. for 30 minutes, cooled, and when the temperature dropped to 75° C., a mixture of 7 parts of N,N-dimethyl-amionoethanol and 280 parts of deionized water was added dropwise over 15 minutes, followed by 15 minutes' standing at 75° C. Upon further cooling, an acrylic emulsion having a solid concentration of 30% was synthesized.

Preparation of colored paint composition (Part 1)

EXAMPLE 24

To a mixture of 61.2 parts (20 parts as solid) of the pigment dispersion paste (B3-1) which was prepared in Example 11, 20 parts (10 parts as solid) of the acrylic polymer (AP-1) solution formed in Synthesis Example 1, 57.1 parts (20 parts as solid) of the polyester polymer (PP-1) solution formed in Synthesis Example 3, 37.5 parts (30 parts as solid) of Cymel™ 325 (Mitsui Cytec Co., Ltd., a methyl etherified melamine resin solution having a solid content of about 80%), 66.7 parts (20 parts as solid) of the acrylic emulsion formed in Synthesis Example 5 was added, and further 1 part of 28% of Primal™ ASE (formed by diluting Primal™ ASE-60, a thickener manufactured by Japan Acryl Chemicals Co., Ltd. with water to a solid content of 28%), 0.8 part of N,N-dimethylaminoethanol, 230 parts of deionized water and 30 parts of 2-ethylhexyl alcohol were added by the order stated, to provide a coloring paint composition having a viscosity of 500 mPa.s. (measured with B-type viscometer at 60 r.p.m.) and a pH of about 8.5.

Examples 25–33 and Comparative Examples 17–20

Example 24 was repeated except that composition of the constituents was varied for each run as shown in Table 7, to provide coloring paint compositions.

Using those paint compositions Examples 24–33 and Comparative Examples 17–20, test panels were prepared by following method.

Preparation of test panels

A 0.8 mm-thick cold rolled dull steel sheet which had been chemically treated with zinc phosphate was applied with an epoxy resin-based cationic electrodeposition paint to a dry film thickness of about 20 μm which was subsequently baked. Onto this electrodeposited paint film, automotive polyester resin-based inter coating paint was applied to a dry film thickness of about 20 μm and baked. This coated steel sheet was wet sanded with #400 sand paper, dried off and degreased with petroleum benzin. Onto so degreased coat surface each of the coloring paint compositions whose viscosity was adjusted to 500 mpa.s (measured with B-type viscometer at 60 r.p.m.) was applied with minibell rotation type electrostatic coater at a booth humidity of 70%, to a dry film thickness of about 15 μm, and allowed to stand at room temperature for about 5 minutes for setting. Each of the paint film was baked with an electric hot air dryer at 80° C. for 10 minutes to evaporate off most of the volatile component. Then the film temperature was dropped to the room temperature and onto which an automotive acrylic resin-based clear paint, Magicron™ TC71 (Kansai Paint Co., Ltd.) was applied to a dry film thickness of about 40 μm, followed by a baking with an electric hot air dryer at 140° C. for 30 minutes, to provide the test panel.

Thus prepared test panels were subjected to various performance tests by the following test methods, with the results as given in Table 7.

<Test methods>

Appearance of coat finish:

The appearance of coat finish was synthetically examined in respect of gloss and fatness, and evaluated by three grading system as follows:

○; good, Δ; poor, X; very poor.

Gloss:

Following JIS K5400 7.6 (1990), 60°-specular gloss of each coated film was measured.

Sharpness:

Sharpness was measured with a portable gloss distinctness meter P.G.D-IV (Japan Color Research Institute). The higher the measured value, the better is the sharpness.

Intimate adhesion:

Following JIS K-5400 8.5.2 (1990) lattice pattern tape method, each eleven parallel straight lines were orthogonally drawn vertically and horizontally at 1 mm intervals on the top coat film surface on each test panel, to form one hundred 1 mm×1 mm squares. Onto the same surface cellophane adhesive tape was applied intimately. The tape was then rapidly peeled off and the extent of peeling of the squares was observed, Evaluation of adhesion was given by a three-grade system as follows:

○: at least 90 squares of the coat film remained unpeeled;

Δ: no less than 50 but less than 90 squares remained unpeeled;

X: less than 50 squares remained unpeeled.

Acid resistance:

An artificial rain (0.5 cc) of the following composition was dropped onto each of the test panels which were heated on 80° C. hot plate for 30 minutes and then washed with water. The coated surfaces were visually examined and evaluated according to the following grading standards:

○: no change observed on the coated surface;

Δ: no whitening or swelling observed on the coated surface but difference in level was recognized at the boundaries; and X: whitening or swelling observed on the coated surface.

The artificial rain used was a blend of 1 mg/g aqueous $NaNO_3$ solution, 19.6 g; 1 mg/g aqueous $KNO_3$ solution, 5.2 g; 1 mg/g aqueous $CaCl_2 \cdot 2H_2O$ solution, 3.7 g; 1 mg/g aqueous $MgSO_4 \cdot 7H_2O$ solution, 8.2 g; 1 mg/g aqueous $(NH_4)_2SO_4$ solution, 73.3 g; 0.1 N aqueous $H_2SO_4$ solution, 30.0 g; 0.1 N aqueous $HNO_3$ solution, 20.0 g; 0.05N aqueous HCl solution, 10.0 g and 1 mg/g aqueous NaF solution, 4.7 g. The pH of the blend was adjusted to 1.0 with $H_2SO_4$.

Solvent resistance:

In a 20° C. room, each test panel surface was rubbed with a piece of cotton gauze soaked with methyl ethyl ketone under about 1 $kg/cm^2$ load over a length of about 5 cm. After 50 times reciprocal rubbing, the surface condition of the test panel was visually graded according to the following standard:

○: no change observed on the coated surface;

Δ: scratches observed on the coated surface; and

X: whitening or swelling observed on the coated surface.

Impact resistance:

Following JIS K-5400 8.3.2 (1990) DuPont impact resistance test, a weight of 500 g with its hitting front end having a diameter of about 12.7 mm was dropped on the coated film surface facing upward, and the maximum dropping distance of the weight without damaging the coated film was measured, the maximum tested distance being 50 cm.

TABLE 7

| | | Example | | | | | | |
|---|---|---|---|---|---|---|---|---|
| | | 24 | 25 | 26 | 27 | 28 | 29 | 30 |
| Pigment dispersion paste | kind | B-1 | B-5 | B-6 | B-7 | B-8 | B-9 | B-10 |
| | amount (part) | | | | 61.2 | | | |
| Acrylic polymer solution | kind | AP-1 | AP-1 | AP-2 | AP-1 | AP-1 | AP-2 | AP-1 |
| | amount (part) | | | | 20 | | | |
| Polyester polymer solution | kind | PP-1 | PP-2 | PP-1 | PP-1 | PP-2 | PP-1 | PP-1 |
| | amount (part) | | | | 57.1 | | | |
| Acrylic emulsion of Synthesis Example 5 (part) | | | | | 66.7 | | | |
| Cymel ™ 327 (part) | | | | | 37.5 | | | |
| 28% Primal ASE-60 (part) | | | | | 1.0 | | | |
| N,N-dimethylaminoethanol (part) | | | | | 0.8 | | | |
| Deionized water (part) | | | | | 320 | | | |
| Film performance | coated film appearance | ○ | ○ | ○ | ○ | ○ | ○ | ○ |
| | gloss (60°) | 85 | 86 | 88 | 89 | 91 | 91 | 86 |
| | sharpness | 1.2 | 1.2 | 1.2 | 1.3 | 1.3 | 1.3 | 1.2 |
| | intimate adhesion | ○ | ○ | ○ | ○ | ○ | ○ | ○ |
| | acid resistance | ○ | ○ | ○ | ○ | ○ | ○ | ○ |
| | solvent resistance | ○ | ○ | ○ | ○ | ○ | ○ | ○ |
| | impact resistance | 50 | 45 | 45 | 45 | 45 | 50 | 45 |

| | | Example | | | Comparative Example | | | |
|---|---|---|---|---|---|---|---|---|
| | | 31 | 32 | 33 | 17 | 18 | 19 | 20 |
| Pigment dispersion paste | kind | B-11 | B-12 | B-16 | BC-1 | BC-2 | BC-3 | BC-7 |
| | amount (part) | | 61.2 | | | 61.2 | | |
| Acrylic polymer solution | kind | AP-2 | AP-2 | AP-2 | AP-1 | AP-1 | AP-1 | AP-1 |
| | amount (part) | | 20 | | | 20 | | |

TABLE 7-continued

| Polyester polymer solution | kind | PP-2 | PP-2 | PP-2 | PP-1 | PP-1 | PP-1 | PP-1 |
|---|---|---|---|---|---|---|---|---|
| | amount (part) | | 57.1 | | | 57.1 | | |
| Acrylic emulsion of Synthesis Example 5 (part) | | | 66.7 | | | 66.7 | | |
| Cymel ™ 327 (part) | | | 33.3 | | | 33.3 | | |
| 28% Primal ASE-60 (part) | | | 1.0 | | | 1.0 | | |
| N,N-dimethylaminoethanol (part) | | | 0.8 | | | 0.8 | | |
| Deionized water (part) | | | 320 | | | 320 | | |
| Film performance | coated film appearance | ○ | ○ | ○ | × | × | × | Δ |
| | gloss (60°) | 85 | 89 | 86 | 68 | 69 | 72 | 78 |
| | sharpness | 1.2 | 1.2 | 1.2 | 0.5 | 0.5 | 0.9 | 0.8 |
| | intimate adhesion | ○ | ○ | ○ | Δ | Δ | Δ | Δ |
| | acid resistance | ○ | ○ | ○ | Δ | Δ | Δ | ○ |
| | solvent resistance | ○ | ○ | ○ | Δ | Δ | Δ | ○ |
| | impact resistance | 50 | 40 | 40 | 35 | 35 | 30 | 35 |

Preparation of pigment dispersing resins (Part 2)

EXAMPLE 34

An ordinary reaction vessel for producing acrylic resins, equipped with a stirrer, thermometer and a reflux condenser was charged with 32 parts of ethylene glycol monobutyl ether and 55.6 parts (25 parts as solid) of the macromonomer (b-1) solution formed in Production Example 5, which were heated under stirring and maintained at 110° C. Into said system a mixture consisting of 20 parts of styrene, 28 parts of methyl methacrylate, 15 parts of n-butyl methacrylate, 5 parts of 2-hydroxyethyl methacrylate, 2 parts of N,N-dimethylaminoethyl methacrylate, 5 parts of NF BISO-MER™ PEM 6E (Dai-ich Kogyo Seiyaku Co., Ltd., polyethylene glycol monometh-acrylate; molecular weight, about 350), 1 part of azobisisobutyronitrile and 5 parts of isobutyl alcohol was added dropwise over a period of 3 hours, followed by 30 minutes' aging at 111° C. Then an additional catalytic liquid mixture consisting of 15 parts of ethylene glycol monobutyl ether and 0.5 part of azobisisobutyronitrile was added dropwise over a period of an hour, followed by another hour's aging at 110° C. Cooling the system, a pigment dispersing resin (A-11) solution having a solid content of 55% was obtained. The resin (A-11) had a resin acid value of about 43 mgKOH/g and a weight-average molecular weight of about 13,500.

EXAMPLES 35–42 and

Comparative Examples 21–24

Example 34 was repeated except that the composition of the blended constituents was varied for each run as shown in the following Table 8, to provide pigment dispersing resins (A-12) to (A-19) according to the present invention and pigment dispersing resins (AC-6) to (AC-9) as products for comparison. The solid contents of the formed solutions and resin acid values and weight-average molecular weights of the pigment dispersing resins were as also shown in Table 8.

TABLE 8

| | Example | | | | | | |
|---|---|---|---|---|---|---|---|
| | 34 | 35 | 36 | 37 | 38 | 39 | 40 |
| Pigment dispersing resin solution | A-11 | A-12 | A-13 | A-14 | A-15 | A-16 | A-17 |
| Ethylene glycol monobutyl ether | 32 | 32 | 32 | 32 | 32 | 32 | 32 |
| Macromonomer solution  kind | b-1 | b-1 | b-1 | b-1 | b-1 | b-1 | b-2 |
| amount (solid part) | 25 | 25 | 25 | 25 | 25 | 25 | 25 |
| Styrene (part) | 20 | 10 | 10 | 20 | 15 | 10 | 10 |
| methyl methacrylate (part) | 28 | 38 | 43 | 28 | 36 | 33 | 23 |
| n-butyl methacrylate (part) | 15 | 15 | 10 | | | | 15 |
| 2-ethylhexyl methacrylate (part) | | | | 10 | 15 | 15 | |
| Lauryl methacrylate (part) | | | | | | | 10 |
| 2-hydroxyethyl methacrylate (part) | 5 | 5 | 5 | 10 | 10 | 10 | 10 |
| Methacrylic acid (part) | | | | | | | |
| Dimethylaminoethyl methacrylate (part) | 2 | 2 | 2 | 2 | | | 2 |
| Methacryloyloxyethyl trimethylammonium chloride (part) | | | | | 4 | | |
| 2-Acrylamide-2-methylsulfonic acid (part) | | | | | | 2 | |
| NF BISOMER ™ PEM6E (part) | 5 | | | 5 | 5 | 5 | 5 |
| NF BISOMER ™ S10W (*1) (part) | | 5 | | | | | |
| NF BISOMER ™ S20W (*2) (part) | | | 5 | | | | |
| Cardura ™ E10 (*3) (part) | | | | | | | |
| Deionized water (part) | | | | | | 5 | |
| Azobisisobutyronitrile (part) | 1 | 1 | 1 | 1 | 1 | 1 | 1 |
| Isobutyl alcohol (part) | 5 | 5 | 5 | 5 | 5 | 5 | 5 |
| Additional catalytic liquid mixture | ethylene glycol monobutyl ether (part) | 15 | 15 | 15 | 15 | 15 | 15 | 15 |
| | azobisisobutyrontrile (part) | 0.5 | 0.5 | 0.5 | 0.5 | 0.5 | 0.5 | 0.5 |

TABLE 8-continued

| | | | | | | | | |
|---|---|---|---|---|---|---|---|---|
| Character-<br>istics | solid content (%) | 55 | 55 | 55 | 55 | 55 | 55 | 55 |
| | resin acid value<br>(mg KOH/g) | 43 | 43 | 43 | 43 | 43 | 43 | 45 |
| | weight-average<br>molecular weight | 13500 | 14500 | 15300 | 13100 | 12900 | 11800 | 9600 |

| | | Example | | Comparative Example | | | |
|---|---|---|---|---|---|---|---|
| | | 41 | 42 | 21 | 22 | 23 | 24 |
| Pigment dispersing resin solution | | A-18 | A-19 | AC-6 | AC-7 | AC-8 | AC-9 |
| Ethylene glycol monobutyl ether | | 27 | 40 | 33 | 33 | 42 | 75 |
| Macromono-  kind | | b-3 | b-4 | b-1 | b-1 | — | — |
| mer solution  amount (solid part) | | 25 | 25 | 25 | 25 | — | — |
| Styrene (part) | | 10 | 10 | 10 | 10 | 20 | 20 |
| methyl methacrylate (part) | | 28 | 38 | 35 | 25 | 48 | 48 |
| n-butyl methacrylate (part) | | 10 | | 10 | 15 | 15 | 15 |
| 2-ethylhexyl methacrylate (part) | | | 10 | | | | |
| Lauryl methacrylate (part) | | | | | | | |
| 2-hydroxyethyl methacrylate (part) | | 10 | | 10 | 5 | 10 | 10 |
| Methacrylic acid (part) | | | 5 | | | | |
| Dimethylaminoethyl methacrylate (part) | | 2 | 2 | 10 | | 2 | 2 |
| Methacryloyloxyethyl trimethyl-<br>ammonium chloride (part) | | | | | | | |
| 2-Acrylamide-2-methylsulfonic acid (part) | | | | | | | |
| NF BISOMER ™ PEM6E (part) | | 5 | 10 | | 20 | 5 | 5 |
| NF BISOMER ™ S10W (*1) (part) | | | | | | | |
| NF BISOMER ™ S20W (*2) (part) | | | | | | | |
| Cardura ™ E10 (*3) (part) | | 10 | | | | | |
| Deionized water (part) | | | | | | | |
| Azobisisobutyronitrile (part) | | 1 | 1 | 1 | 1 | 6 | 1 |
| Isobutyl alcohol (part) | | 5 | 5 | 5 | 5 | 5 | 5 |
| Additional  ethylene glycol mono-<br>catalytic  butyl ether (part) | | 15 | 15 | 20 | 20 | 20 | 20 |
| liquid  azobisisobutyronitrile<br>mixture  (part) | | 0.5 | 0.5 | 0.5 | 0.5 | 0.5 | 0.5 |
| Character-  solid content (%) | | 55 | 55 | 55 | 55 | 60 | 50 |
| istics  resin acid value<br>(mg KOH/g) | | 45 | 38 | 30 | 30 | 35 | 35 |
| weight-average<br>molecular weight | | 15500 | 14100 | 11200 | 12400 | 7200 | 32000 |

(*1) to (*3) are same as in Table 3.

Preparation of pigment dispersions (Part 2)

EXAMPLES 43–57 and Comparative Examples 25–34

Using those pigment dispersing resin solutions synthesized in the above Examples 34–42 and Comparative Examples 21–24, pigments, neutralizing amine (N,N-dimethylaminoethanol) and deionized water at the ratios specified in the following Table 9, various blends were formed. Each blend was put in a wide mouthed glass bottle of 225 cc in capacity together with glass beads of approximately 1.3 mm in diameter serving as the dispersing medium, and the bottle was hermitically sealed, followed by 4 hours' dispersion with a paint shaker. Thus, water-based pigment dispersions (B-17)-(B-31) and (BC-8) to (BC-17) were prepared.

Performance tests of those water-based pigment dispersions which were obtained in above Examples 43–57 and Comparative Examples 25–34 were conducted by the following methods, with the results as shown in Table 9.

<Test methods>

Appearance of coated film:

Each of the pigment dispersion paste was applied onto a 100×200 mm transparent PET film with a bar coater to a dry film thickness of 15 $\mu$m, and baked at 140° C. for 15 minutes. The extent of turbidity of the coating on the PET film was visually evaluated according to the following grading standard:

○: uniform and perfectly free of turbidity

Δ: slightly turbid

X: considerably turbid.

Gloss:

Each pigment dispersion was applied onto the PET film with a doctor blade (5 mils, 125 $\mu$m) and dried. The gloss of the formed coating was determined by measuring its 60° mirror surface reflectivity following JIS K5400 7.6 (1990).

Light transmission:

Each pigment dispersion was applied onto the PET film with a doctor blade (4 mils, 125 $\mu$m) and dried. The percent transmission of the formed coating was measured with a turbidimeter (COH-300) following the equation below to evaluate transparency:

light transmission (%)=100×[1-(scattered light intensity/radiated light intensity)]

Viscoelasticity characteristics:

Viscosity [Pascal.sec (Pa.sec.)] and yield point (dyn/cm$^2$) were measured with a dynamic viscoelasticity measuring apparatus, MR-300 (Rheology Co.).

TABLE 9

| | Example | | | | | | | |
|---|---|---|---|---|---|---|---|---|
| | 43 | 44 | 45 | 46 | 47 | 48 | 49 | 50 |
| Pigment dispersion | B-17 | B-18 | B-19 | B-20 | B-21 | B-22 | B-23 | B-24 |
| Acrylic resin solution kind | A-1 | A-1 | A-1 | A-1 | A-2 | A-3 | A-4 | A-5 |
| Acrylic resin solution amount (part) | 181.8 | 181.8 | 181.8 | 181.8 | 181.8 | 181.8 | 181.8 | 181.8 |
| Pigment RT 355D* (part) | 100 | | | | 100 | 100 | 100 | 100 |
| Pigment G314** (part) | | 100 | | | | | | |
| Pigment MT500HD*** (part) | | | 200 | | | | | |
| Pigment Raven 5000 UIII**** (part) | | | | 20 | | | | |
| N,N-dimethylaminoethanol (part) | 3.1 | 3.1 | 3.1 | 3.1 | 3.1 | 3.1 | 3.1 | 3.1 |
| Deionized water (part) | 327.2 | 327.2 | 327.2 | 327.2 | 327.2 | 327.2 | 327.2 | 327.2 |
| Test result coated film appearance | ○ | ○ | ○ | ○ | ○ | ○ | ○ | ○ |
| Test result gloss (60°) | 97 | 95 | 86 | 85 | 94 | 96 | 95 | 95 |
| Test result light transmission (%) | 90 | 92 | 78 | — | 92 | 91 | 92 | 92 |
| Test result visocisty (Pa · sec) | 2.1 | 1.6 | 1.1 | 2.1 | 1.6 | 1.5 | 1.9 | 1.6 |
| Test result yield point (dyn/cm$^2$) | 4.9 | 4.5 | 2.5 | 5.9 | 5.2 | 4.5 | 4.8 | 4.2 |

| | Example | | | | | | |
|---|---|---|---|---|---|---|---|
| | 51 | 52 | 53 | 54 | 55 | 56 | 57 |
| Pigment dispersion | B-25 | B-26 | B-27 | B-28 | B-29 | B-30 | B-31 |
| Acrylic resin solution kind | A-6 | A-7 | A-8 | A-8 | A-8 | A-8 | A-9 |
| Acrylic resin solution amount (part) | 181.8 | 181.8 | 181.8 | 181.8 | 181.8 | 181.8 | 181.8 |
| Pigment RT 355D* (part) | 100 | 100 | 100 | | | | 100 |
| Pigment G 314** (part) | | | | 100 | | | |
| Pigment MT500HD*** (part) | | | | | 200 | | |
| Pigment Raven 5000 UIII**** (part) | | | | | | 20 | |
| N,N-dimethylaminoethanol (part) | 3.1 | 3.1 | 3.1 | 3.1 | 3.1 | 3.1 | 3.6 |
| Deionized water (part) | 327.2 | 327.2 | 327.2 | 327.2 | 327.2 | 327.2 | 327.2 |
| Test result coated film appearance | ○ | ○ | ○ | ○ | ○ | ○ | ○ |
| Test result gloss (60°) | 93 | 91 | 97 | 95 | 85 | 88 | 92 |
| Test result light transmission (%) | 88 | 89 | 94 | 91 | 80 | — | 92 |
| Test result visocisty (Pa · sec) | 1.7 | 1.5 | 2.9 | 2.4 | 2.1 | 1.8 | 2.2 |
| Test result yield point (dyn/cm$^2$) | 3.8 | 3.5 | 6.8 | 7.1 | 4.5 | 7.5 | 5.5 |

| | Comparative Example | | | | | | | | | |
|---|---|---|---|---|---|---|---|---|---|---|
| | 25 | 26 | 27 | 28 | 29 | 30 | 31 | 32 | 33 | 34 |
| Pigment dispersion | BC-8 | BC-9 | BC-10 | BC-11 | BC-12 | BC-13 | BC-14 | BC-15 | BC-16 | BC-17 |
| Acrylic resin solution kind | AC-1 | AC-2 | AC-3 | AC-5 | AC-5 | AC-5 | AC-4 | AC-4 | AC-4 | AC-4 |
| Acrylic resin solution amount (part) | 181.8 | 181.8 | 166.7 | 166.7 | 166.7 | 166.7 | 200 | 200 | 200 | 200 |
| Pigment RT 355D* (part) | 100 | 100 | 100 | | | | 100 | | | |
| Pigment G 314** (part) | | | | 100 | | | | 100 | | |
| Pigment MT500HD*** (part) | | | | | 200 | | | | 200 | |
| Pigment Raven 5000 UIII**** (part) | | | | | | 20 | | | | 20 |
| N,N-dimethylaminoethanol (part) | 2.5 | 2.5 | 2.9 | 2.9 | 2.9 | 2.9 | 2.9 | 2.9 | 2.9 | 2.9 |
| Deionized water (part) | 327.2 | 327.2 | 342.3 | 342.3 | 342.3 | 342.3 | 309.0 | 309.0 | 309.0 | 309.0 |
| Test result coated film appearance | × | Δ | × | × | × | × | Δ | Δ | Δ | × |
| Test result gloss (60°) | 79 | 81 | 72 | 78 | 69 | 65 | 85 | 80 | 72 | 66 |
| Test result light transmission (%) | 71 | 80 | 64 | 78 | 58 | — | 81 | 78 | 65 | — |
| Test result visocisty (P · sec) | 2.8 | 2.5 | 1.2 | 1.4 | 1.8 | 2.3 | 6.5 | 3.9 | 4.9 | 5.6 |
| Test result yield point (dyn/cm$^2$) | 6.1 | 5.6 | 3.6 | 4.4 | 4.2 | 4.9 | 22 | 18 | 16 | 18 |

*,**** are same as in Table 4.

Preparation of colored paint composition (Part 2)

EXAMPLE 58

To a mixture of 61.2 parts (20 parts as solid in which 10 parts were the pigment and 10 parts were the dispersing resin) of the pigment dispersion paste (B-17) which was prepared in Example 43, 40 parts (20 parts as solid) of the acrylic polymer (AP-1) solution formed in Synthesis Example 1, 57.1 parts (20 parts as solid) of the polyester polymer (PP-1) formed in Synthesis Example 3, 50 parts (40 parts as solid) of Cymel™ 325 (Mitsui Cytec Co., Ltd., a methyl etherified melamine resin solution having a solid content of about 80%), 33.3 parts (10 parts as solid) of the acrylic emulsion formed in Synthesis Example 5 was added, and further 1 part of 28% of Primal™ ASE (formed by diluting Primal™ ASE-60, a thickener manufactured by Japan Acryl Chemicals Co., Ltd. with water to a solid content of 28%), 1.2 part of N,N-dimethylaminoethanol, 230 parts of deionized water and 30 parts of 2-ethylhexyl alcohol were added, to provide a coloring paint composition having a viscosity of 500 mPa.s. (measured with B-type viscometer at 60 r.p.m.) and a pH of about 8.5.

EXAMPLES 59–66 and Comparative Examples 35–38

Example 58 was repeated except that composition of the constituents was varied for each run as shown in Table 10, to provide coloring paint compositions.

Using those paint compositions obtained in Examples 59–66 and Comparative Examples 35–38, test panels were prepared by the same method as before. The panels were evaluated of their film appearance, gloss, sharpness, intimate adhesion, acid resistance, solvent resistance and impact resistance by the same test methods as earlier described. The results were as shown in Table 10.

TABLE 10

|  |  | Example |  |  |  |  |  |  |
|---|---|---|---|---|---|---|---|---|
|  |  | 58 | 59 | 60 | 61 | 62 | 63 | 64 |
| Pigment dispersion paste | kind | B-17 | B-21 | B-22 | B-23 | B-24 | B-25 | B-26 |
|  | amount (part) |  |  |  | 61.2 |  |  |  |
| Acrylic polymer solution | kind | AP-1 | AP-1 | AP-2 | AP-1 | AP-1 | AP-2 | AP-1 |
|  | amount (part) |  |  |  | 40 |  |  |  |
| Polyester polymer solution | kind | PP-1 | PP-2 | PP-1 | PP-1 | PP-2 | PP-1 | PP-1 |
|  | amount (part) |  |  |  | 57.1 |  |  |  |
| Acrylic emulsion of Synthesis Example 5 (part) |  |  |  |  | 33.3 |  |  |  |
| Cymel ™ 327 (part) |  |  |  |  | 50 |  |  |  |
| 28% Primal ASE-60 (part) |  |  |  |  | 1.0 |  |  |  |
| N,N-dimethylaminoethanol (part) |  |  |  |  | 1.2 |  |  |  |
| Deionized water (part) |  |  |  |  | 305 |  |  |  |
| Film performance | coated film appearance | ○ | ○ | ○ | ○ | ○ | ○ | ○ |
|  | gloss (60°) | 92 | 90 | 88 | 89 | 88 | 89 | 86 |
|  | sharpness | 1.3 | 1.3 | 1.2 | 1.3 | 1.3 | 1.3 | 1.2 |
|  | intimate adhesion | ○ | ○ | ○ | ○ | ○ | ○ | ○ |
|  | acid resistance | ○ | ○ | ○ | ○ | ○ | ○ | ○ |
|  | solvent resistance | ○ | ○ | ○ | ○ | ○ | ○ | ○ |
|  | impact resistance | 50 | 45 | 45 | 45 | 45 | 50 | 50 |

|  |  | Example |  | Comparative Example |  |  |  |
|---|---|---|---|---|---|---|---|
|  |  | 65 | 66 | 35 | 36 | 37 | 38 |
| Pigment dispersion paste | kind | B-27 | B-31 | BC-8 | BC-9 | BC-10 | BC-14 |
|  | amount (part) |  | 61.2 |  |  | 61.2 |  |
| Acrylic polymer solution | kind | AP-2 | AP-2 | AP-1 | AP-1 | AP-1 | AP-1 |
|  | amount (part) |  | 40 |  |  | 40 |  |
| Polyester polymer solution | kind | PP-2 | PP-2 | PP-1 | PP-1 | PP-1 | PP-1 |
|  | amount (part) |  | 57.1 |  |  | 57.1 |  |
| Acrylic emulsion of Synthesis Example 5 (part) |  |  | 33.3 |  |  | 33.3 |  |
| Cymel ™ 327 (part) |  |  | 50 |  |  | 50 |  |
| 28% Primal ASE-60 (part) |  |  | 1.0 |  |  | 1.0 |  |
| N,N-dimethylaminoethanol (part) |  |  | 1.2 |  |  | 1.2 |  |
| Deionized water (part) |  |  | 305 |  |  | 305 |  |
| Film performance | coated film appearance | ○ | ○ | Δ | Δ | × | Δ |
|  | gloss (60°) | 92 | 88 | 75 | 77 | 69 | 78 |
|  | sharpness | 1.3 | 1.2 | 0.9 | 0.9 | 0.9 | 0.8 |
|  | intimate adhesion | ○ | ○ | Δ | Δ | Δ | Δ |
|  | acid resistance | ○ | ○ | Δ | Δ | Δ | ○ |
|  | solvent resistance | ○ | ○ | Δ | Δ | Δ | ○ |
|  | impact resistance | 45 | 50 | 35 | 35 | 30 | 35 |

As is clear from the above-demonstrated results, use of the resins for dispersing water-based pigments makes it possible to provide water-based pigment dispersions excelling in wetting property and dispersion stability even at high pigment concentration, which also have low viscosity and excellent color-developing property, Use of the water-based pigment dispersions, therefore, enables to provide paint compositions excelling in pigment color developing property, appearance of coated film and coated film performance such as weatherbility and physical properties. The compositions furthermore exhibit good pigment dispersion stability and can conveniently have high pigment concentration.

What is claimed is:

1. A pigment dispersing resin having a weight-average molecular weight within a range of 3,000–100,000, which is obtained by copolymerizing a monomeric mixture comprising a macro monomer (A) which is obtained by (co)polymerizing monomeric component comprising at least one polymerizable monomer selected from methacrylic acid esters and styrene and optionally methacrylic acid, in the presence of a metal complex which is a catalytic chain transfer agent or an addition-cleavage-type chain transfer agent and optionally a radical polymerization initiator, a polymerizable, unsaturated monomer (B) which contains at least one ionic functional group selected from amino, quaternary ammonium salt and sulfonic acid groups, a nonionic, polymerizable unsaturated monomer (C) containing a polyoxyalkylene chain and other ethylenically unsaturated monomer(s) (D), in the presence of a radical polymerization initiator.

2. A pigment dispersing resin according to claim 1, in which the catalytic chain transfer agent is a cobalt complex and the addition-cleavage type chain transfer agent is 2,4-diphenyl-4-methyl-1-pentene.

3. A pigment dispersing resin according to claim 1, in which said macromonomer (A) is one obtained through copolymerization of 0–70% by weight of methacrylic acid with 30–100% by weight of at least one copolymerizable monomer selected from the group consisting of methacrylic acid esters and styrene, the percentages being based on the combined weight of all the monomers used.

4. A pigment dispersing resin according to claim 1, in which the macromonomer (A) has a resin acid value of 30–450 mgKOH/g.

5. A pigment dispersing resin according to claim 1, in which the macromonomer (A) has a weight-average molecular weight of 300–15,000.

6. A pigment dispersing resin according to claim 1, in which the macromonomer (A) has a polymerizable unsaturated bond at one terminal of its molecule.

7. A pigment dispersing resin according to claim 1, in which the macromonomer (A) is obtained by solution polymerization.

8. A pigment dispersing resin according to claim 1, in which the ionic functional group-containing polymerizable unsaturated monomer (B) is selected from the group consisting of N,N-dialkyl-aminoalkyl (meth)acrylate, (meth)acryloyloxyalkyl trialkylammonium halide and (meth)acrylamide alkanesulfonic acid.

9. A pigment dispersing resin according to claim 1, in which the ionic functional group-containing polymerizable unsaturated monomer (B) is selected from the group consisting of N,N-dimethylaminoethyl (meth)acrylate, N,N-diethylaminoethyl (meth)acrylate, N,N-dimethylaminopropyl (meth)acrylate, N,N-di-tert.-butylaminoethyl (meth)acrylate, N,N-dimethylaminobutyl (meth)acrylate, methacryloyloxyethyltrimethylammonium chloride and 2-acrylamide-2-methylpropanesulfonic acid.

10. A pigment dispersing resin according to claim 1, in which the ionic functional group-containing polymerizable unsaturated monomer (B), is selected from the group consisting of N,N-dimethylaminoethyl (meth)acrylate, methacryloyloxyethyltrimethylammonium chloride and 2-acrylamide-2-methylpropanesulfonic acid.

11. A pigment dispersing resin according to claim 1, in which the nonionic polymerizable unsaturated monomer (C) is a compound represented by a following formula, $$CH_2=C(R^1)COO(C_nH_{2n}O)_m-R^2$$

in which
$R^1$ stands for hydrogen or $CH_3$,
$R^2$ stands for hydrogen or $C_1-C_4$ alkyl,
m is an integer of 4–60, and
n is an integer of 2–3,
wherein the n oxyalkylene units $(C_nH_{2n}O)$ may all be same or different.

12. A pigment dispersing resin according to claim 1, in which the nonionic polymerizable unsaturated monomer (C) is selected from the group consisting of tetraethylene glycol (meth)acrylate, methoxytetraethylene glycol (meth)acrylate, ethoxytetraethylene glycol (meth)acrylate, n-butoxytetraethylene glycol (meth)acrylate, tetrapropylene glycol (meth)acrylate, methoxytetrapropylene glycol (meth)acrylate, ethoxytetrapropylene glycol (meth)acrylate, n-butoxytetrapropylene glycol (meth)acrylate, polyethylene glycol (meth)acrylate, polypropylene glycol (meth)acrylate, methoxypolyethylene glycol (meth)acrylate and ethoxypolyethylene glycol (meth)acrylate.

13. A pigment dispersing resin according to claim 1, in which the nonionic polymerizable unsaturated monomer (C) is polyethylene glycol (meth)acrylate or polypropylene glycol (meth)acrylate.

14. A pigment dispersing resin according to claim 1, in which the other ethylenically unsaturated monomer (D) is at least one monomer selected from the group consisting of methacrylic acid esters and styrene.

15. A pigment dispersing resin according to claim 1, which is obtained by copolymerizing
macromonomer (A): 5–70% by weight,
monomer (B): 0.1–20% by weight,
monomer (C): 1–40% by weight, and
monomer (D): 20–90% by weight,
based on the total weight of the monomers (A), (B), (C) and (D).

16. A pigment dispersing resin according to claim 1, which is obtained by copolymerizing
macromonomer (A): 10–60% by weight,
monomer (B): 0.5–15% by weight,
monomer (C): 3–30% by weight, and
monomer (D): 30–80% by weight,
based on the total weight of the monomers (A), (B), (C) and (D).

17. A pigment dispersing resin according to claim 1, which has a weight-average molecular weight within a range of 3,000–70,000.

18. A pigment dispersing resin according to claim 1, which has a resin acid value of 10–150 mgKOH/g.

19. A water-based pigment dispersion which comprises the pigment dispersing resin of claim 1, pigment, aqueous medium and a basic neutralizing agent, and optionally a dispersion assistant.

20. A water-based paint composition which comprises a water-based pigment-dispersion of claim 19.

21. A water-based paint composition according to claim 20 which is an automotive top coating paint.

22. Articles coated with a water-based paint composition of claim 20.

23. A pigment dispersing resin having a weight-average molecular weight within a range of 3,000–100,000 which is obtained by forming a copolymer (X) by copolymerizing a monomeric mixture comprising a carboxyl-containing macromonomer (A-1) having a resin acid value of 50–450 mgKOH/g which is obtained through copolymerization of methacrylic acid with at least one copolymerizable monomer selected from methacrylic acid esters and styrene, in the presence of a metal complex which is a catalytic chain transfer agent or an addition-cleavage type chain transfer agent and optionally a radical polymerization initiator,
a polymerizable, unsaturated monomer (B) which contains at least one ionic functional group selected from amino, quaternary ammonium salt and sulfonic acid groups,
a nonionic polymerizable unsaturated monomer (C) containing polyoxyalkylene chain and
other ethylenically unsaturated monomer (D),
in the presence of a radical polymerization initiator, and introducing a long-chain alkyl group into said copolymer (X) by reacting it with an epoxy-containing long-chain compound (E).

24. A pigment dispersing resin according to claim 23, in which the catalytic chain transfer agent is a cobalt complex and the addition-cleavage type chain transfer agent is 2,4-diphenyl-4-methyl-1-pentene.

25. A pigment dispersing resin according to claim 23, in which said macromonomer (A-1) is one obtained through copolymerization of 8–70% by weight of methacrylic acid with 30–92% by weight of at least one copolymerizable monomer selected from the group consisting of methacrylic acid esters and styrene, the percentages being based on the combined weight of all the monomers used.

26. A pigment dispersing resin according to claim 23, in which the macromonomer (A-1) has a resin acid value of 65–400 mgKOH/g.

27. A pigment dispersing resin according to claim 23, in which the macromonomer (A-1) has a weight-average molecular weight of 300–15,000.

28. A pigment dispersing resin according to claim 23, in which the macromonomer (A-1) has a one polymerizable unsaturated bond at one terminal of its molecule.

29. A pigment dispersing resin according to claim 23, in which the macromonomer (A-1) is obtained by solution polymerization.

30. A pigment dispersing resin according to claim 23, in which the copolymer (X) has a weight-average molecular weight of 3,000–100,000 and a resin acid value of 10–200 mgKOH/g.

31. A pigment dispersing resin according to claim 23, in which said epoxy-containing long chain alkyl compound (E) contains 6–24 carbon atoms in its long chain alkyl moiety.

32. A pigment dispersing resin according to claim 23, in which 2–60 parts by weight of the epoxy-containing long chain alkyl compound (E) per 100 parts by weight (as solid) of the copolymer (X) are subjected to the esterification reaction with said copolymer (E).

33. A pigment dispersing resin according to claim 23 which has a weight-average molecular weight of 3,000–70,000.

34. A pigment dispersing resin according to claim 23 which has a resin acid value of 10–150 mgKOH/g.

35. A water-based pigment dispersion which comprises the pigment dispersing resin in claim 23, pigment, aqueous medium and a basic neutralizing agent, and optionally a dispersion assistant.

36. A water-based paint composition which comprises a water-based pigment-dispersion of claim 35.

37. A water-based paint composition according to claim 36 which is an automotive top coating paint.

38. Articles coated with a water-based paint composition of claim 36.

39. A pigment dispersing resin having a weight-average molecular weight within a range of 3,000–100,000, which is obtained by copolymerizing, in the presence of a radical polymerization initiator, a monomeric mixture comprising a long chain alkyl group-containing macromonomer (A-2) which is formed by reacting the carboxyl-containing macromonomer (A-1) as described in claim 23 with an epoxy-containing long chain alkyl compound (E), a polymerizable, unsaturated monomer (B) which contains at least one ionic functional group selected from amino, quaternary ammonium salt and sulfonic acid groups, a nonionic polymerizable unsaturated monomer (C) containing polyoxyalkylene chain and other ethylenically unsaturated monomer (D).

40. A pigment dispersing resin according to claim 39, in which said epoxy-containing long chain alkyl compound (E) has 6–24 carbon atoms in its long chain alkyl moiety.

41. A pigment dispersing resin according to claim 39, in which 2–60 parts by weight of said epoxy-containing long chain alkyl compound (E) per 100 parts (as solid) by weight of the macromonomer (A-1) are subjected to the esterification reaction to form the macromonomer (A-2).

42. A pigment-dispersing resin according to claim 39, which has a weight-average molecular weight of 3,000–70,000.

43. A pigment dispersing resin according to claim 39, which has a resin acid value of 10–150 mgKOH/g.

44. A pigment dispersing resin having a weight-average molecular weight within a range of 3,000–100,000 and a resin acid value within a range of 10–200 mgKOH/g, which is obtained by copolymerizing, in the presence of a radical polymerization initiator, a monomeric mixture comprising a macromonomer (A-4) which contains a long chain alkyl group and polymerizable unsaturated group and which is obtained by reacting the carboxyl-containing macromonomer (A-1) as described in claim 19 with an epoxy-containing long chain alkyl compound (E) and an epoxy-containing polymerizable unsaturated monomer (F), a polymerizable, unsaturated monomer (B) which contains at least one ionic functional group selected from amino, quaternary ammonium salt and sulfonic acid groups, a nonionic polymerizable unsaturated monomer (C) containing polyoxyalkylene chain and other ethylenically unsaturated monomer (D).

45. A pigment dispersing resin according to claim 44, in which the epoxy-containing long chain alkyl compound (E) has 6–24 carbon atoms in its long chain alkyl moiety.

46. A pigment dispersing resin according to claim 44, in which 2–60 parts by weight of the epoxy-containing long chain alkyl compound (E) per 100 parts by weight (as solid) of the macromonomer (A-1) is subjected to the esterification reaction.

47. A pigment dispersing resin according to claim 44, in which the epoxy-containing polymerizable unsaturated compound (F) is glycidyl methacrylate.

48. A pigment dispersing resin according to claim 44, in which 0.5–15 parts by weight of said epoxy-containing polymerizable compound (F) per 100 parts by weight (as solid) of the macromonomer (A-1) is subjected to the esterification reaction.

49. A pigment dispersing resin according to claim 44, in which said macromonomer (A-4) contains on average 0.005–2.5 mols of polymerizable unsaturated groups per 1 kg of the macromonomer (A-4).

50. A pigment dispersing resin according to claim 44, which has a weight-average molecular weight of 3,000–70,000.

51. A pigment dispersing resin according to claim 44, which has a resin acid value of 10–150 mgKOH/g.

52. A pigment dispersing resin having a weight-average molecular weight within a range of 3,000–100,000 and a resin acid value within a range of 10–200 mgKOH/g, which is obtained by copolymerizing, in the presence of a radical polymerization initiator, a monomeric mixture comprising a polymerizable unsaturated group-containing macromonomer (A-3) formed by subjecting the carboxyl-containing macromonomer (A-1) as described in claim 23 to an esterification reaction with an epoxy-containing, polymerizable unsaturated compound (F), a polymerizable, unsaturated monomer (B) which contains at least one ionic functional group selected from amino, quaternary ammonium salt and sulfonic acid groups, a nonionic polymerizable unsaturated monomer (C) containing polyoxyalkylene chain and other ethylenically unsaturated monomer (D).

53. A pigment dispersing resin according to claim 52, in which the epoxy-containing unsaturated compound (F) is glycidyl methacrylate.

54. A pigment dispersing resin according to claim 52, in which 0.5–15 parts by weight of the epoxy-containing polymerizable unsaturated compound (F) per 100 parts by weight (as solid) of the macromonomer (A-1) are subjected to the esterification reaction to form the macromonomer (A-3).

55. A pigment dispersing resin according to claim 52, in which the macromonomer (A-3) has 0.005–2.5 mols of polymerizable unsaturated groups per 1 kg of the macromonomer (A-3).

56. A pigment dispersing resin according to claim 52, which has a weight-average molecular weight of 3,000–70,000.

57. A pigment dispersing resin according to claim 52, which has a resin acid value of 10–150 mgKOH/g.

58. A pigment dispersing resin having a weight-average molecular weight within a range of 3,000–100,000 and a resin acid value within a range of 10–200 mgKOH/g, which is obtained by copolymerizing, in the presence of a radical polymerization initiator, a monomeric mixture comprising the polymerizable unsaturated group-containing macromonomer (A-3) as described in claim 52, a polymerizable, unsaturated monomer (B) which contains at least one ionic functional group selected from amino, quaternary ammonium salt and sulfonic acid groups, a nonionic polymerizable unsaturated monomer (C) containing polyoxyalkylene chain and other ethylenically unsaturated monomer (D), and introducing into the resulting copolymer (Y) a long chain alkyl group by reacting the copolymer (Y) with an epoxy-containing long chain compound (E).

59. A pigment dispersing resin according to claim 58, in which the copolymer (Y) has a weight-average molecular weight of 3,000–100,000 and a resin acid value of 10–200 mgKOH/g.

60. A pigment dispersing resin according to claim 58, in which 2–60 parts by weight of the epoxy-containing long chain alkyl compound (E) per 100 parts by weight (as solid) of the copolymer (Y) are subjected to the esterification reaction to form the resin.

61. A pigment dispersing resin according to claim 58, which has a weight-average molecular weight of 3,000–70,000.

62. A pigment dispersing resin according to claim 58, which has a resin acid value of 10–150 mgKOH/g.

* * * * *